United States Patent [19]

Hamada et al.

[11] Patent Number: 5,677,907
[45] Date of Patent: Oct. 14, 1997

[54] METHOD OF CALCULATING CELL LOSS RATIO AND CALL ACCEPT CONTROLLER USING THE SAME METHOD

[75] Inventors: Takeo Hamada, Santa Clara, Calif.; Takafumi Chujo, Kawasaki, Japan

[73] Assignee: Fujitsu Limited, Kanagawa, Japan

[21] Appl. No.: 540,444

[22] Filed: Oct. 6, 1995

[30] Foreign Application Priority Data

Mar. 16, 1995 [JP] Japan ................................. 7-057705
Mar. 17, 1995 [JP] Japan ................................. 7-059518

[51] Int. Cl.$^6$ ................................................. H04J 3/14
[52] U.S. Cl. ............................................. 370/253
[58] Field of Search ..................... 370/17, 60, 60.1, 370/94.1, 94.2, 94.3, 13, 14, 54, 58.1–58.3, 252, 253, 232, 233, 234, 235

[56] References Cited

U.S. PATENT DOCUMENTS

| | | | |
|---|---|---|---|
| 5,189,667 | 2/1993 | Esaki et al. | 370/60 |
| 5,267,232 | 11/1993 | Katsube et al. | 370/17 |
| 5,519,689 | 5/1996 | Kim | 370/17 |

Primary Examiner—Douglas W. Olms
Assistant Examiner—Ajit Patel
Attorney, Agent, or Firm—Helfgott & Karas, P C.

[57] ABSTRACT

A cell loss ratio calculating method is a method of calculating a cell loss ratio of a buffer for storing call cells from a plurality of traffic sources and comprises a distribution expressing step, a number-of-average-arrivals expressing step, an average path calculating step and a cell loss ratio calculating step. In the distribution expressing step, a distribution of the number of cells accumulated within a time for which the cell passes the buffer is expressed by use of a Poisson distribution on an assured side. In the number-of-average-arrivals expressing step, the number-of-cells distribution is expressed with parameters representing a number of average arrivals of the Poisson distribution. In average path calculating step, an average path is calculated with respect to time-variations of a cell arrival ratio and a distribution of the cell arrival ratio. In the cell loss ratio calculating step, the cell loss ratio of the buffer is calculated by using a result of the calculation in the average path calculating step as well as by using a table for storing a precalculated value of a number-of-lost-cells expected value corresponding to each number of average arrivals.

24 Claims, 33 Drawing Sheets

FIG. 8

| INDEX | NUMBER-OF-LOST-CELLS EXPECTED VALUE |
|---|---|
| 0 | 0 |
| 1 | 0 |
| ⋮ | ⋮ |
| 68 | 4.49672e-05 |
| 69 | 8.67462e-05 |
| 70 | 0.000163074 |
| 71 | 0.000298987 |
| 72 | 0.000535055 |
| 73 | 0.000935309 |
| 74 | 0.00159824 |
| 75 | 0.00267157 |
| 76 | 0.0043715 |
| 77 | 0.00700686 |
| 78 | 0.00110085 |
| ⋮ | ⋮ |
| 198 | 125.44 |
| 199 | 126.72 |
| 200 | 128 |

FIG. 24

```
Integrate() {
    int i;

for(i = K-1; i >= 0; i--) {
        z[i] += z[i+1];
    }
}       /* end of Differentiate */
```

FIG. 25

```
Differentiate() {
    int i;

for(i = 0; i < K; i++) {
        z[i] -= z[i+1];
    }
}       /* end of Differentiate */
```

INTRA K-INTERVAL NUMBER-OF-CELLS $C_K(t)$

METHOD OF CALCULATING CELL LOSS RATIO AND CALL ACCEPT CONTROLLER USING THE SAME METHOD

BACKGROUND OF THE INVENTION

The present invention relates to a method of calculating a cell loss ratio and a call accept controller using this method and, more particularly, to a cell loss ratio calculating method employed for securing a QOS (Quality Of Service) after being multiplexed in an ATM (Asynchronous Transfer Mode) in which UPC (User Parameter Control) is conducted.

In recent years, the ATM has been a prospective mode for a B-ISDN (Broadband Integrated Services Digital Network)-oriented switching transmission system. The ATM is a mode of transferring pieces of information of sounds, images, data, etc. by dividing the information into a block called a [cell] having a fixed length in accordance with a generation of the information. A communications network for performing communications on the basis of this transfer mode is termed an ATM network.

In the ATM network, when connecting a call, a connection request is given to the network (switching equipment), and, after the connection has been permitted, a necessary amount of cells corresponding to this call flow into the network.

The ATM network is equipped with terminals switching equipments, links, etc. The switching equipments are connected to each other via the links, and the terminal is accommodated in one of such switching equipments. The cells arriving at the ATM switching equipment from an input link are switched in a switch unit and transmitted via an output buffer to an output link. Further, when making a call connecting request, the cell containing an item of data about the connection request is processed in a call accept control unit, thus determining whether the call connection is permitted or not.

After accepting the call, the call flows in the form of the cell within the network. In this case, the output buffer in the switching equipment is capable of storing only a fixed or less number of cells, and, therefore, if the inflow cells are excessive, the cells are to be disposed of. The cell disposal deteriorates a quality of communications. Accordingly, a determination of whether or not a cell loss ratio in the output buffer falls within an allowable range is needed for the call accept control and for a design of the ATM network.

Herein, the term "call accept control" is defined as control of making an estimation and an evaluation about whether or not the cell loss ratio of the output buffer falls within the allowable range after accepting the call connecting request on the basis of parameters declared from the call when making the call connecting request and determining whether the call is accepted or not. That is, if the cell loss ratio after accepting the call exceeds the allowable range, the call is not accepted but accepted if within the allowable range.

Note that the estimation and the evaluation about whether or not the cell loss ratio falls within the allowable range are, more specifically, made in consideration of parameters declared from an in-connection call and a quantity of cells generated by the in-connection call in addition to the parameters declared by the call making the connection request.

Further, the declared parameters are defined as data on the quantity of cells generated by the call, and it is desired that the parameters be easily declarable. Then, for example, an average bit rate and a peak bit rate (PBR) are therefore employed. Note that the average bit rate is obtained by dividing 1-cell bit length by an average cell generating interval. Further, the peak bit rate is obtained by dividing the 1-cell bit length by a minimum cell generating interval.

Next, according to the call accept control in the ATM, there is effected a quick response to the connection request from the call, and hence it is required that the cell loss ratio be estimated (evaluated) at a high speed when accepting the call that is making the connection request.

Further, the estimation of the cell loss ratio is also needed for a calculation of a link capacity or the line that is to be performed in the ATM network designing. Herein, the term "ATM network designing" is to design an output buffer quantity and a link capacity on the basis of a number of call connections, a statistical property relative to the cells generated from the call and quality specified values such as a predetermined cell loss ratio specified value and a maximum allowable delay, etc.

Thus, the calculation of the cell loss ratio is required for the call accept control and the ATM network designing, but, with respect to a cell loss ratio calculating method, the prior arts disclosed hitherto will be explained. First, a prior art (1) is disclosed in Japanese Patent Laid-Open Publication No. 3-235550 (hereinafter called a document (2)) and stated on pp. 1512–1521 of "Call Admission Control in an ATM Network Using Upper Bound of Cell Loss Probability", written by H. Saito, IEEE Trans. on Comm. Vol. 40, No. 9, September, 1992 (hereinafter called a document (3)). The documents (2) and (3) show a cell disposal ratio estimating method and a call accept controller using this method. Shown further is a method of evaluating the cell disposal ratio on an assured side by obtaining a worst pattern in a statistical sense from a statistical conjecture on the number of cells arriving within a fixed time.

Then, as a prior art (2), [Call Accept Control System and Apparatus in ATM] (hereinafter called a document (1)), filed for Patent by the present inventors, Hamada, Nakajyo, et al. in Japan discloses a method of calculating a delay and a cell loss ratio (CLR).

Further, as a prior art (3), there are given [Analysis and Application of Multiplexer in ATM Network for Performing UPC (1)] (hereinafter referred to as a document (5)) published by Hamada and Nakajyo on pp. 55–61 of the Electronic Communications Information Association Technological Report IN93-73, October, 1993 and [Analysis and Application of Multiplexer in ATM Network for Performing UPC] (hereinafter referred to as a document (6)) published by Hamada and Nakajyo on pp. 37–44 of the Technological Report IN93-124, February, 1994, compiled by Institute of Electronics, Communication and Information of Engineers. The documents (5) and (6) show a method of calculating a delay and a cell loss ratio with respect to a traffic having an ON/OFF burst pattern with the aid of a concept of an upper bound.

Moreover, as a prior art (4), there are given 1) [ATM Network Traffic Management System by Deterministic UPC] (hereinafter called a document (10)), written by Yamanaka, Sato and Sato on pp. 253–264 of the Bulletin of Articles B-1, Vol. J76-B-I, No. 3, March, 1993, compiled by Institute of Electronics, Communication and Information of Engineers, 2) "Performance Limitation of Leaky Bucket Algorithm for Usage Parameter Control and Bandwidth Allocation Methods" (hereinafter called a document (11)), written by N. Yamanaka, Y. Sato and K. Sato on pp. 82–86 of IEICE Trans. Commun., Vol. E75-B, No. 2, February, 1992, 3) [Multiplexing Characteristic of ATM Cell Traffic Passing Leaky Bucket Type UPC] (hereinafter called a document (12)), written by Yamashita and Sato on pp. 57–of the Technological Report CS93-173, January, 1994, compiled by Institute of Electronics, Communication and Information of Engineers, 4) [Analysis of VBR Path/Channel Multiplexing Characteristic Specified by Deterministic Parameter] (hereinafter called a document (7)), written by Nakagawa on pp. 1–6 of Technological Report CAS91-150, March, 1992 compiled by Institute of Electronics, Communication and Information of Engineers and 5) [Characteristic Evaluation of Multiplex ATM Connection Based on Leaky Bucket Type UPC] (hereinafter called a document (13)) written by Watanabe and et al. on pp. 51–61 of Technological Report SSE94-136, October, 1994, compiled by Institute of Electronics, Communication and Information of Engineers. Those documents given above state a method of estimating a worst pattern from knowledge based on an empirical method or on simulation because of the leaky bucket worst pattern being unknown.

Especially in the documents (10) and (11), the evaluation is given based on the simulation. Further, in the document (12), the evaluation is made by use of the large deviation theory. Moreover, in the document (7), the evaluation is performed by using a Chernoff upper bound. Then, the document (13) proposes a method of making an approximation on an assured side by using an M/D/1 model from a result of performing the simulation.

Herein, according to the prior art (1), the convolution of the probability distribution is sequentially effected by a product-sum operation, and hence, if a multiplicity of calls including a plurality of traffic sources arrive in groups, a quantity of calculation increases, resulting in a problem to cause a lack of a real-time property. Further, the consideration is not given to the number-of-cell-arrivals distribution of the cell which corresponds to the leaky bucket passage pattern, and, therefore, if the number-of-cell-arrivals distribution of the call is the leaky bucket passage pattern, the problem is that the cell loss ratio can not be calculated on an assured side.

Next, the prior art (2) exhibits some improvement in terms of a less quantity of calculations than in the prior art (1). It is, however, required that results of the calculations performed beforehand for every traffic source be held in the form of a table. The problem is that a capacity of a memory for storing that table increases in proportion to the number of traffic sources to be dealt with.

Further, according to the prior art (2), it is required that a linear equation expressed by a matrix with a size of $(K+1) \times (K+1)$ be solved in order to obtain the cell loss ratio, wherein K is the buffer length. Then, the quantity of the calculation is $O(K^3)$, and this induces such a problem that the real-time property is easily deteriorated.

Then, according to the prior art (3), the traffic source known as an ON/OFF traffic source is assumed, and there exists a problem in which this can not correspond to a periodic pattern of the call generated from a general traffic source.

Moreover, according to the prior art (4), the worst pattern of the leaky bucket is not known, and hence, if the number-of-cell-arrivals distribution of the call is the leaky bucket passage pattern, the problem is that the cell loss ratio can not be calculated on the assured side.

SUMMARY OF THE INVENTION

It is a first object of the present invention to provide a cell loss ratio calculating method capable of calculating a cell loss ratio of a buffer for storing cells of calls from a plurality of traffic sources in real time on an assured side.

Further, it is a second object of the present invention to provide a cell loss ratio calculating method capable of calculating a cell loss ratio to theoretically assure the overestimated side when a number-of-cell-arrivals distribution of calls from a plurality of traffic sources is a leaky bucket passage pattern.

Then, it is a third object of the present invention to provide a call accept controller capable of efficiently performing call accept control and improving multiplexing efficiencies of an ATM network and other communication networks.

<First Cell Loss Ratio Calculating Method of Present Invention>

A first call loss ratio calculating method of the present invention is constructed as follows to accomplish the first object.

That is, a method of calculating a cell loss ratio of a buffer for storing call cells from a plurality of traffic sources comprises a distribution expressing step, a number-of-average-arrivals expressing step, an average path calculating step and a cell loss ratio calculating step.

(Distribution Expressing Step)

In the distribution expressing step, there is expressed a distribution of the number of cells accumulated within a time for which the cell passes the buffer by use of a Poisson distribution on an assured side.

(Number-of-Average-Arrivals Expressing Step)

In the number-of-average-arrivals expressing step, the number-of-cells distribution is expressed with parameters representing a number of average arrivals of the Poisson distribution.

(Average Path Calculating Step)

In the average path calculating step, an average path is calculated with respect to time-variations of a cell arrival ratio and a distribution of the cell arrival ratio.

(Cell Loss Ratio Calculating Step)

In the cell loss ratio calculating step, the cell loss ratio of the buffer is calculated by using a result of the calculation in the average path calculating step as well as by using a table for storing a precalculated value of a number-of-lost-cells expected value corresponding to each number of average arrivals.

<Second Cell Loss Ratio Calculating Method of Present Invention>

A second cell loss ratio calculating method of the present invention is constructed as follows to accomplish the second object.

That is, a method of calculating a cell loss ratio of a buffer for storing call cells from a plurality of traffic sources comprises an interval segmentation step, an assured-side path calculating step, a number-of-average-arrivals parameter calculating step, a number-of-lost-cells expected value calculating step, a cell arrival ratio distribution upper bound calculating step, an according-to-interval number-of-lost-cells calculating step, a number-of-lost-cells expected value calculating step, a number-of-average-arrival-cells calculating step and a cell loss ratio assured-side calculating step.

(Interval Segmentation Step)

In the interval segmentation step, a cell arrival ratio is segmented into a plurality of intervals in accordance with a value thereof on the basis of traffic data inputted from the traffic sources.

(Assured-Side Path Calculating Step)

In the assured-side path calculating step, an assured-side path of each traffic type to be multiplexed is calculated for each of the intervals obtained by the segmentation in the interval segmentation step on the basis of the traffic data inputted from the traffic sources and the intervals obtained by the segmentation in the interval segmentation step.

(Number-of-Average-Arrivals Parameter Calculating Step)

In the number-of-average-arrivals parameter calculating step, a number-of-average-arrivals parameter of the assured-side path calculated in the assured-side path calculating step is calculated for every interval obtained by the segmentation in the interval segmentation step.

(Number-of-Lost-Cells Expected Value Calculating Step)

In the number-of-lost-cells expected value calculating step, an expected value of the number of lost cells for every assured-side path is calculated for every interval obtained by the segmentation in the interval segmentation step on the basis of at least the number-of-average-arrivals parameter calculated in the number-of-average-arrivals parameter calculating step.

(Cell Arrival Ratio Distribution Upper Bound Calculating Step)

In the cell arrival ratio distribution upper bound calculating step, an upper bound of the cell arrival ratio distribution is calculated for every interval obtained by the segmentation in the interval segmentation step.

(According-to-Interval Number-of-Lost-Cells Calculating Step)

In the according-to-interval number-of-lost-cells calculating step, a number-of-lost-cells expected value as a contribution from the relevant interval is calculated according to every interval obtained by the segmentation in the interval segmentation step on the basis of the number-of-lost-cells expected value according to every interval that is calculated in the number-of-lost-cells expected value calculating step and the upper bound of the cell arrival ratio distribution calculated in the cell arrival ratio distribution upper bound calculating step.

(Number-of-Lost-Cells Expected Value Calculating Step)

In the number-of-lost-cells expected value calculating step, a number-of-lost-cells expected value is calculated by adding the number-of-lost-cells expected value according to every interval that is calculated in the according-to-interval number-of-lost-cells calculating step.

(Number-of-Average-Arrival-Cells Calculating Step)

In the number-of-average-arrival-cells calculating step, the number of average arrival cells for a predetermined observation time of each traffic source is calculated.

(Cell Loss Ratio Assured-Side Calculating Step)

In the cell loss ratio assured-side calculating step, a cell loss ratio of the buffer is calculated on the assured side on the basis of the number-of-lost-cells expected value calculated in the number-of-lost-cells expected value calculating step and the number of average arrival cells that is calculated in the number-of-average-arrival-cells calculating step.

Note that [calculating on the assured side] implies an overestimation on the basis of a true cell loss ratio.

<Third Cell Loss Ratio Calculating Method of Present Invention>

A third cell loss ratio calculating method of the present invention is constructed as follows to accomplish the first object described above.

That is, in the second cell loss ratio calculating method, the traffic data inputted from the traffic source are an item of data for specifying a peak rate and an item of data for specifying an average rate.

<Fourth Cell Loss Ratio Calculating Method of Present Invention>

A fourth cell loss ratio calculating method of the present invention is constructed as follows to accomplish the first object described above.

That is, in the second cell loss ratio calculating method, the interval segmentation step includes an average dispersion calculating step of calculating an average $\mu$ and a dispersion $\sigma$ of the cell arrival ratio distribution, a deviation value calculating step of calculating a deviation value K corresponding to a calculation accuracy, a number-of-intervals calculating step of calculating a number-of-intervals L which corresponds to an interval accuracy and an equally segmenting step of equally segmenting an interval from $\mu-K\sigma$ to $\mu+K\sigma$ into L-segments of intervals.

<Fifth Cell Loss Ratio Calculating Method of Present Invention>

A fifth cell loss ratio calculating method of the present invention is constructed as follows to accomplish the first object described above.

That is, in the second cell loss calculating method, the assured-side path calculating step includes a time constant/cell arrival ratio calculating step of calculating a time constant and a cell arrival ratio in the relevant interval according to every traffic type, an individual assured-side path calculating step of individually calculating the assured-side path with respect to every traffic type and an assured-side path synthesizing step of synthesizing the individual assured-side paths calculated in the individual assured-side path calculating step.

<Sixth Cell Loss Ratio Calculating Method of Present Invention>

A sixth cell loss ratio calculating method of the present invention is constructed as follows to accomplish the first object described above.

That is, in the second cell loss ratio calculating method, the number-of-average-arrival parameter calculating step is to calculate an area under the assured-side path calculating in the assured-side path calculating step as a number-of-average-arrivals parameter.

<Seventh Cell Loss Ratio Calculating Method of Present Invention>

A seventh cell loss ratio calculating method of the present invention is constructed as follows to accomplish the first object described above.

That is, in the second cell loss ratio calculating method, the number-of-lost cells expected value calculating step includes an index calculating step of calculating an index on the basis of the number-of-average-arrivals parameters and the unit of a table by making use of the table in which the indices are previously made corresponding to the number-of-lost-cells expected values and a number-of-lost-cells expected value reading step of reading the number-of-lost-cells expected value of the table which corresponds to the index calculated in the index calculating step.

<Eighth Cell Los Ratio Calculating Method of Present Invention>

An eighth cell loss ratio calculating method of the present invention is constructed as follows to accomplish the first object described above.

That is, in the second cell loss ratio calculating method, the according-to-interval number-of-lost-cells calculating step includes an inter two-points upper bound value calculating step of calculating a value obtained by subtracting an upper bound value of the cell arrival ratio distribution at the lower edge of each interval from the upper bound value of the cell arrival ratio distribution at the upper edge of each interval and an according-to-interval number-of-lost-cells expected value calculating step of calculating a value obtained by multiplying the value calculated in the inter two-points upper bound value calculating step by the number-of-lost-cells expected value in the form of a number-of-lost-cells expected value as a contribution from the relevant interval.

<Ninth Cell Loss Ratio Calculating Method of Present Invention>

A ninth cell loss ratio calculating method of the present invention is constructed as follows to accomplish the second object described above.

That is, a method of calculating a cell loss ratio of a buffer for storing call cells from a plurality of traffic sources comprises a second-order survivor function calculating step, a minimum upper bound calculating step, a number-of-lost-cells expected value calculating step, a number-of-cell-arrivals expected value calculating step and a cell loss ratio assured-side calculating step.

(Second-Order Survivor Function Calculating Step)

In the second-order survivor function calculating step, a second-order survivor function relative to a maximally dense packing pattern obtained based on traffic data inputted from the traffic source is calculated for every traffic source.

(Minimum Upper Bound Calculating Step)

In the minimum upper bound calculating step, a minimum upper bound is calculated for every traffic source by performing an envelope arithmetic on a set of second-order survivor functions calculated in the second-order survivor function calculating step.

(Number-of-Lost-Cells Expected Value Calculating Step)

In the number-of-lost-cells expected value calculating step, a number-of-lost-cells expected value is calculated by convoluting the minimum upper bound for every traffic source that is calculated in the minimum bound calculating step.

(Number-of-Cell-Arrivals Expected Value Calculating Step)

In the number-of-cell-arrivals expected value calculating step, there is calculated a number-of-cell-arrivals expected value for a predetermined observation time.

(Cell Loss Ratio Assured-Side Calculating Step)

In the cell loss ratio assured-side calculating step, a cell loss ratio of the buffer is calculated on an assured side on the basis of the number-of-lost-cells expected value calculated in the number-of-lost-cells expected value calculating step and the number-of-cell-arrivals expected value calculated in the number-of-cell-arrivals expected value calculating step.

Note that [calculating on the assured side] implies the overestimation on the basis of the true cell loss ratio.

<Tenth Cell Los Ratio Calculating Method of Present Invention>

A tenth cell loss ratio calculating method of the present invention is constructed as follows to accomplish the second object described above.

That is, in the ninth cell loss ratio calculating method, the second-order survivor function calculating step includes a number-of-cell-arrivals calculating step of calculating a number of cell arrivals within the predetermined observation time on the basis of the maximally dense packing pattern, a first-order survivor function acquiring step for acquiring a first-order survivor function by integrally calculating a number of cell arrivals that is calculated in the number-of-cell-arrivals calculating step and a second-order survivor function acquiring step of acquiring a second-order survivor function by integrally calculating the first-order survivor function acquired in the first-order survivor function acquiring step.

<Eleventh Cell Loss Ratio Calculating Method of Present Invention>

In an eleventh cell loss ratio calculating method, the envelop arithmetic effected in the minimum upper bound calculating step is an arithmetic of selecting a maximum value among the values of the respective survivor functions.

<Twelfth Cell Loss Ratio Calculating Method of Present Invention>

A twelfth cell loss ratio calculating method of the present invention is constructed as follows to accomplish the second object described above.

That is, in the ninth cell loss ration calculating method, each of the minimum upper bounds is convoluted based on a large deviation theory and evaluated on the assured side in the number-of-lost-cells expected value calculating step.

<First Call Accept Controller of Present Invention>

A first call accept controller of the present invention is constructed as follows to accomplish the third object described above.

That is, the call accept controller comprises a cell loss ratio calculation unit and a call accept determination unit.

(Cell Loss Ratio Calculation Unit)

The cell loss ratio calculation unit calculates a cell loss ratio of a buffer for storing call cell from a plurality of traffic sources by the first through eighth cell loss ratio calculating methods.

(Call Accept Determination Unit)

The call accept determination unit compares a cell loss ratio calculated value calculated by the cell loss ratio calculation unit with a predetermined cell loss ratio fiducial value and determines whether or not a call accept request from the traffic source is permitted based on a result of this comparison.

<Second Call Accept Controller of Present Invention>

A second call accept controller of the present invention is constructed as follows to accomplish the third object described above.

That is, the second call accept controller comprises a cell loss ration calculation unit and a call accept determination unit.

(Cell Loss Ratio Calculation Unit)

The cell loss ratio calculation unit calculates a cell loss ratio of a buffer for storing call cell from a plurality of traffic sources by the ninth through twelfth cell loss ratio calculating methods.

(Call Accept Determination Unit)

The call accept determination unit compares a cell loss ratio calculated value calculated by the cell loss ratio calculation unit with a predetermined cell loss ratio fiducial value and determines whether or not a call accept request from the traffic source is permitted based on a result of this comparison.

According to the first cell loss ratio calculating method of the present invention, first, in the distribution expressing step, the distribution of the number of cells accumulated within a time for which the cell passes the buffer is expressed on the assured side by use of the Poisson distribution.

Then, in the number-of-average-arrivals expressing step, the number-of-cells distribution is expressed with the parameters representing the number of average arrivals of the Poisson distribution.

Subsequently, in the average path calculating step, the average path is calculated with respect to the time-variations of the cell arrival ratio and the distribution of the cell arrival ratio.

Then, in the cell loss ratio calculating step, the cell loss ratio of the buffer is calculated by using the result of the calculation in the average path calculating step as well as by using the table for storing the precalculated value of the number-of-lost-cells expected value corresponding to each number of average arrivals.

Next, according to the second through eighth cell loss ratio calculating methods of the present invention, first, in the interval segmentation step, the cell arrival ratio is segmented into the plurality of intervals in accordance with the value thereof on the basis of the traffic data.

Then, in the assured-side path calculating step, the assured-side path of each traffic type to be multiplexed is calculated for each of the intervals on the basis of the traffic data and the intervals.

Then, in the number-of-average-arrivals parameter calculating step, the number-of-average-arrivals parameter of the assured-side path is calculated for every interval.

Subsequently, in the number-of-lost-cells expected value calculating step, the expected value of the number of lost cells for every assured-side path is calculated for every interval on the basis of at least the number-of-average-arrivals parameter.

Then, in the cell arrival ratio distribution upper bound calculating step, the upper bound of the cell arrival ratio distribution is calculated for every interval.

Then, in the according-to-interval number-of-lost-cells calculating step, the number-of-lost-cells expected value as a contribution from the relevant interval is calculated according to every interval on the basis of the number-of-lost-cells expected value according to every interval and the upper bound of the cell arrival ratio distribution.

Subsequently, in the number-of-lost-cells expected value calculating step, a number-of-lost-cells expected value is calculated.

Then, in the number-of-average-arrival-cells calculating step, the number of average arrival cells for the predetermined observation time of each traffic source is calculated.

Then, the cell loss ratio of the buffer is calculated on the assured side on the basis of the number-of-lost-cells expected value and the number of average arrival cells.

As explained above, according to the first through eighth cell loss ratio calculating methods of the present invention, the upper bound of the cell loss ratio is calculated by use of the table, thereby making it possible to calculated the cell loss ratio of the buffer for storing the call cells from the plurality of traffic sources in real time on the asured side. Further, the size of the table is fixed irrespective of the number of traffic types and the number of acceptable calls, and hence this is advantageous in terms of mounting thereof.

Next, according to the ninth through twelfth cell loss ratio calculating methods, first, in the second-order survivor function calculating step, the second-order survivor function is calculated for every traffic source on the basis of the traffic data.

Then, in the minimum upper bound calculating step, the minimum upper bound is calculated for every traffic source by performing the envelope arithmetic on a set of second-order survivor functions.

Subsequently, in the number-of-lost-cells expected value calculating step, the number-of-lost-cells expected value is calculated by convoluting the minimum upper bound for every traffic source.

Then, in the number-of-cell-arrivals expected value calculating step, there is calculated the number-of-cell-arrivals expected value for the predetermined observation time.

Then, in the cell loss ratio assured-side calculating step, the cell loss ratio of the buffer is calculated on an assured side.

As described above, according to the ninth through twelfth cell loss ratio calculating methods of the present invention, if the number-of-cell-arrivals distribution of the calls from the plurality of traffic sources is the leaky bucket passage pattern, it is possible to calculate the cell loss ratio to theoretically assure the overestimated side.

Further, according to the ninth through twelfth cell loss ratio calculating methods of the present invention, the overestimated side is assured, and the ATM network exhibiting the high efficiency can be designed.

Moreover, according to the ninth through twelfth cell loss ratio calculating methods of the present invention, the quantity of the calculation is proportional to the length of the buffer for storing the cells. However, the buffer length is well small in the range of utilization, and, therefore, the calculation can be performed in real time.

Next, according to the first call accept controller, the cell loss ratio calculation unit calculates the cell loss ratio of the buffer by the first through eighth cell loss ratio calculating methods of the present invention. Then, the call accept determination unit compares a cell loss ratio calculated value calculated by the cell loss ratio calculation unit with the predetermined cell loss ratio fiducial value and determines whether or not the call accept request is permitted based on the result of this comparison.

As explained above, according to the first call accept controller of the present invention, the call accept control is carried out by use of the first through eighth cell loss ratio calculating methods of the present invention. Therefore, the call accept control can be efficiently done, and the multiplexing efficiencies of the ATM network and other communication networks can be improved.

Next, according to the second call accept controller of the present invention, the cell loss ratio calculation unit calculates the cell loss ratio of the buffer by the ninth through twelfth cell loss ratio calculating methods of the present invention. Then, the call accept determination unit compares the cell loss ratio calculated value calculated by the cell loss ratio calculation unit with the predetermined cell loss ratio fiducial value and determines whether or not the call accept request is permitted based on the result of this comparison.

As described above, according to the second call accept controller of the present invention, the following effects are exhibited. The call accept control is conducted by use of the ninth through twelfth cell loss ratio calculating methods of the present invention. Therefore, the call accept control can be efficiently executed, and the multiplexing efficiencies of the ATM network and other communication networks can be improved.

BRIEF DESCRIPTION OF THE DRAWINGS

Other objects and advantages of the present invention will become apparent during the following discussion in conjunction with the accompanying drawings, in which:

FIG. 8 is a diagram showing a number-of-lost-cells expected value storage table in the first embodiment;

FIG. 24 is a diagram illustrating an example of a program for executing an integral operation of a survivor function in the second embodiment;

FIG. 25 is a diagram illustrating an example of a program for executing a differential operation of the survivor function in the second embodiment;

DETAILED DESCRIPTION OF THE PREFERRED EMBODIMENTS

Specific embodiments of the present invention will hereinafter be discussed.

(1) First Embodiment

<Outline of First Embodiment>

A first embodiment is concerned with a call accept controller. The call accept controller, when requests for accepting calls are given from a plurality of traffic sources, compares a value obtained by calculating a cell loss ratio of a buffer for storing call ATM cells (hereinafter simply referred to as cells) on an assured side (overestimation) with a predetermined cell loss ratio fiducial value and, on the basis of a result of this comparison, controls the call accept request.

This call accept controller is provided as one function within a switching equipment but may be provided in the form of an addition to the switching equipment.

<Network Environment in First Embodiment>

Figure 1:
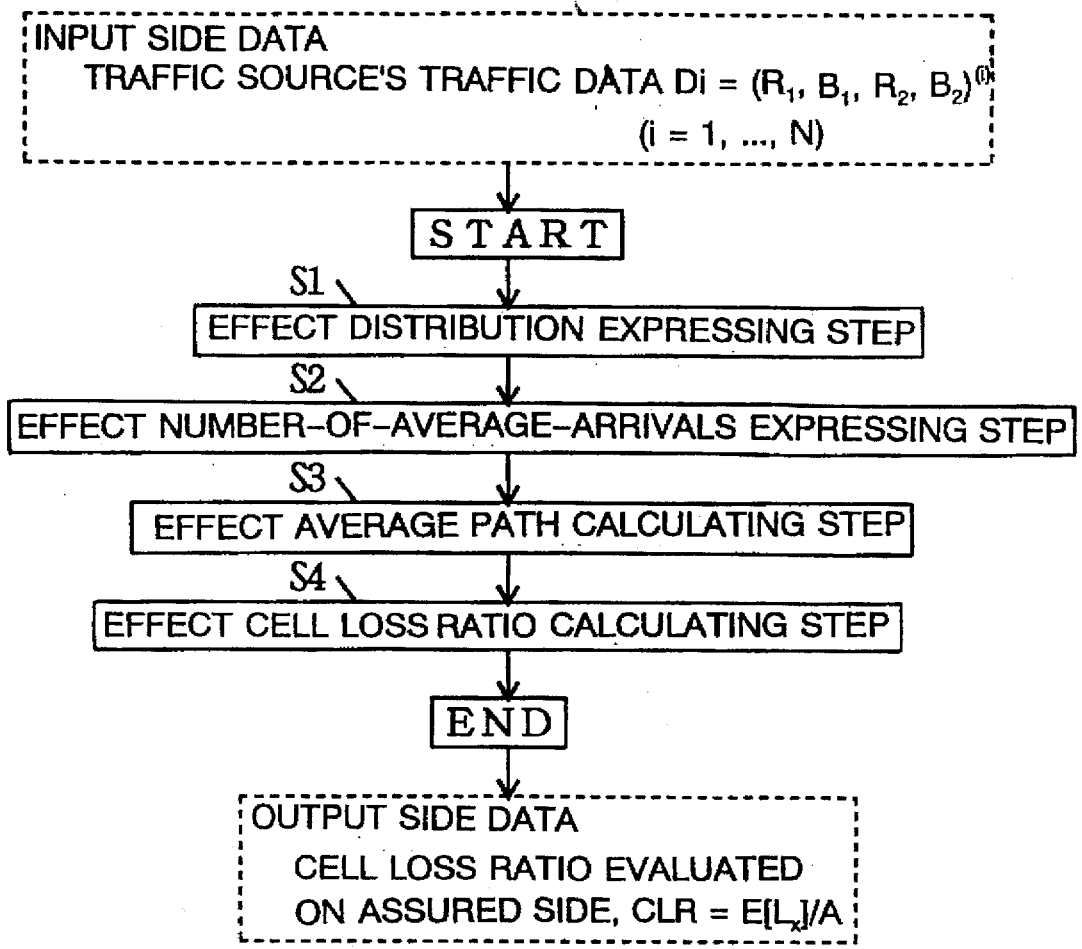
FIG. 1 is a principle flowchart corresponding to a first cell loss ratio calculating method of the present invention.
Figure 2:
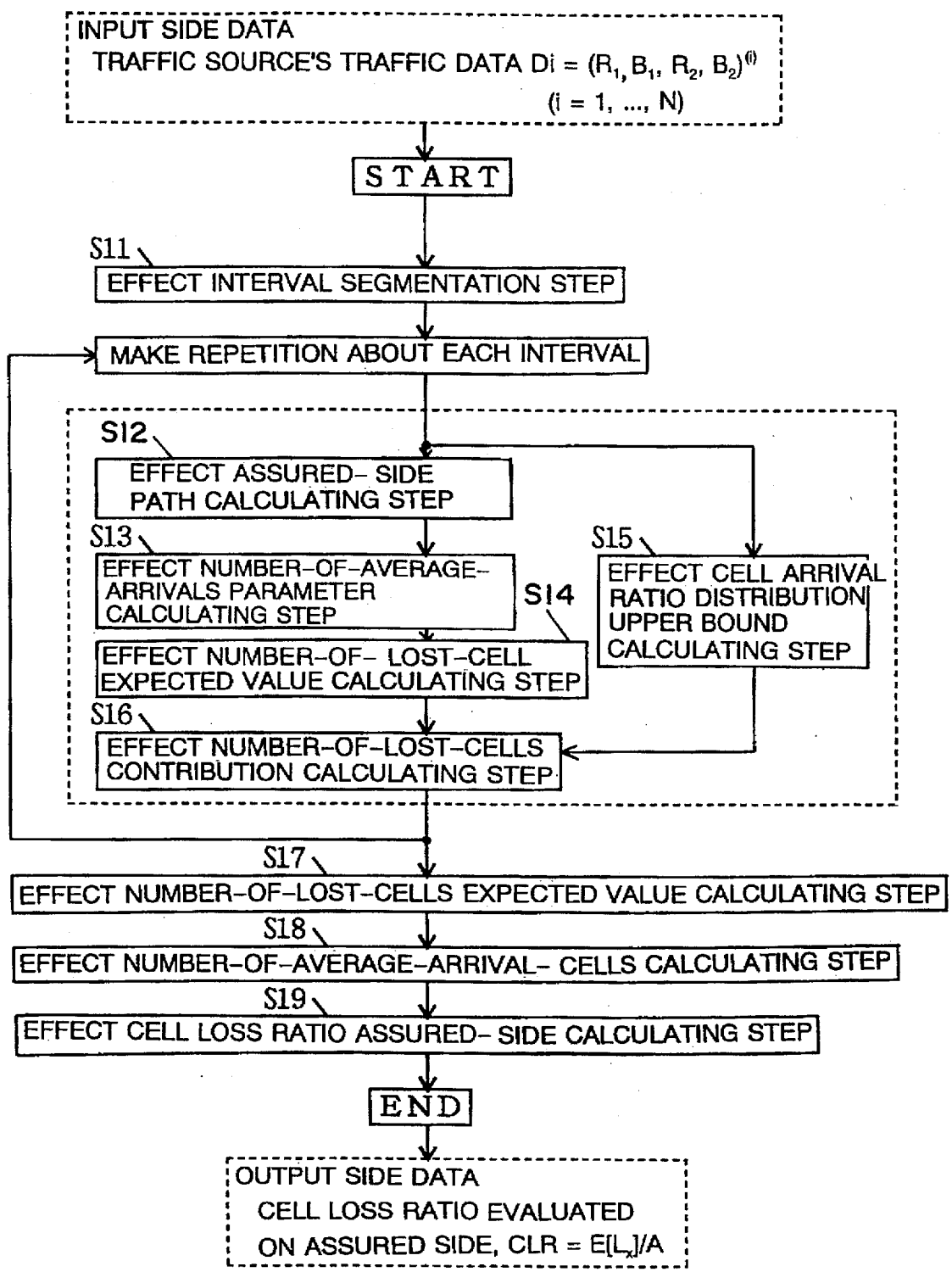
FIG. 2 is a principle flowchart corresponding to a second cell loss ratio calculating method of the present invention.
Figure 3:
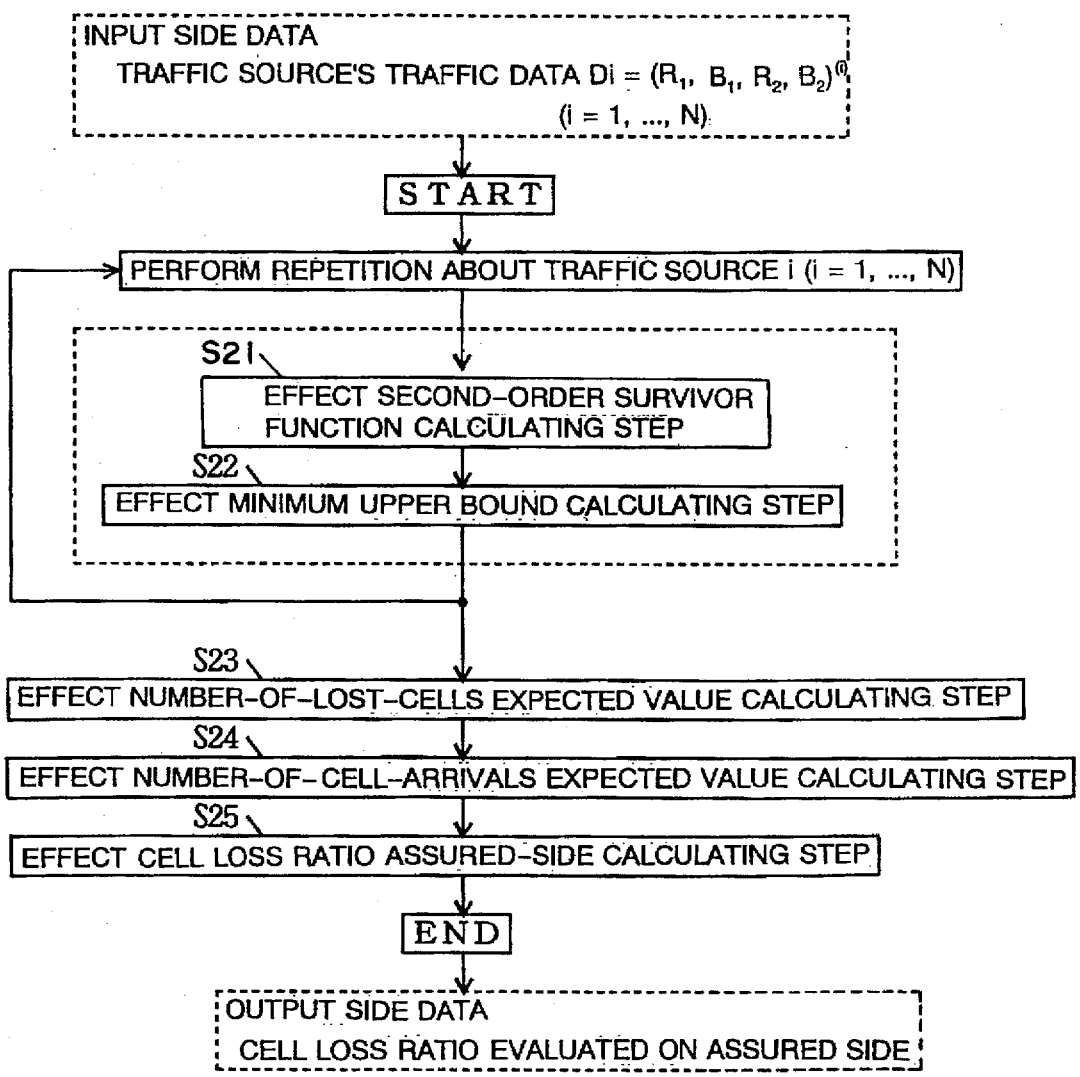
FIG. 3 is a principle flowchart corresponding to a ninth cell loss ratio calculating method of the present invention.
Figure 4:
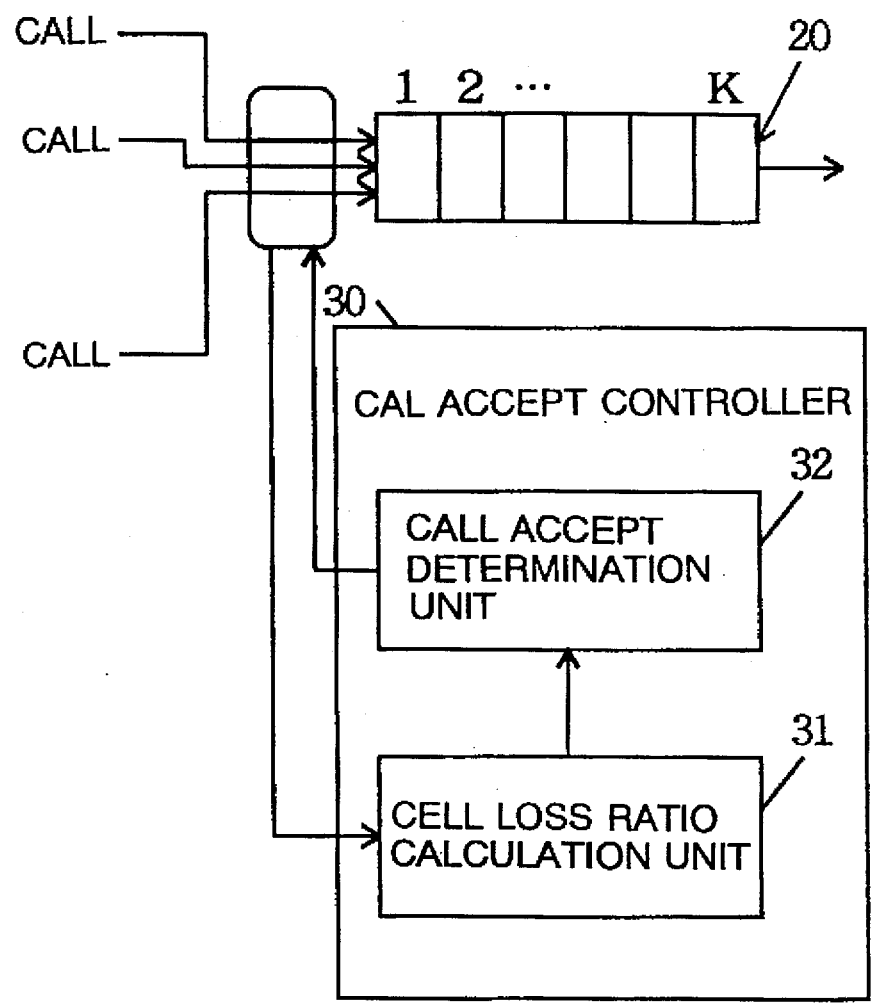
FIG. 4 is a principle block diagram illustrating a call accept controller in first and second embodiments of the present invention.
Figure 5:
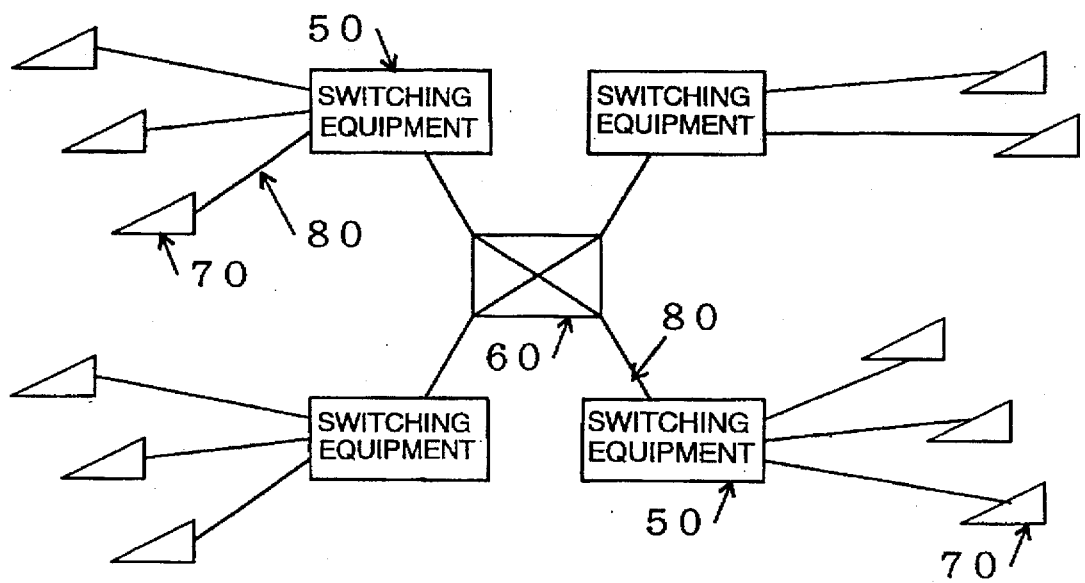
FIG. 5 is a diagram showing a network environment in the first and second embodiment.

FIG. 5 is a diagram illustrating a network environment in the first embodiment. As shown in FIG. 5, four sets of switching equipments 50 are connected via transmission paths 80 to a cross connect device 60. Then, two or three terminals 70 are connected via the transmission paths 80 to each switching equipment 50. Note that an arbitrary number of switching equipments 40 may be provided without being limited to 4. Further, an arbitrary number of terminals 70 may also be connected.

Then, the terminal 70 transmits parameters ($R_1$, $B_1$, $R_2$, $B_2$) showing characteristics of a traffic source to the switching equipment 50. The parameters ($R_1$, $B_1$, $R_2$, $B_2$) are stated on page 1 in the document (7). In the following discussion, it is assumed that the simply termed "traffic data" indicate the parameters ($R_1$, $B_1$, $R_2$, $B_2$).

According to a Leaky Bucket (LB) algorithm, there is assumed a virtual buffer having a reading speed represented by R and a buffer length represented by B. Then, a peak rate is specified based on a couple of parameters ($R_1$, $B_1$), while an average rate is specified based on another couple of parameters ($R_2$, $B_2$).

<Construction of First Embodiment>

Figure 6:
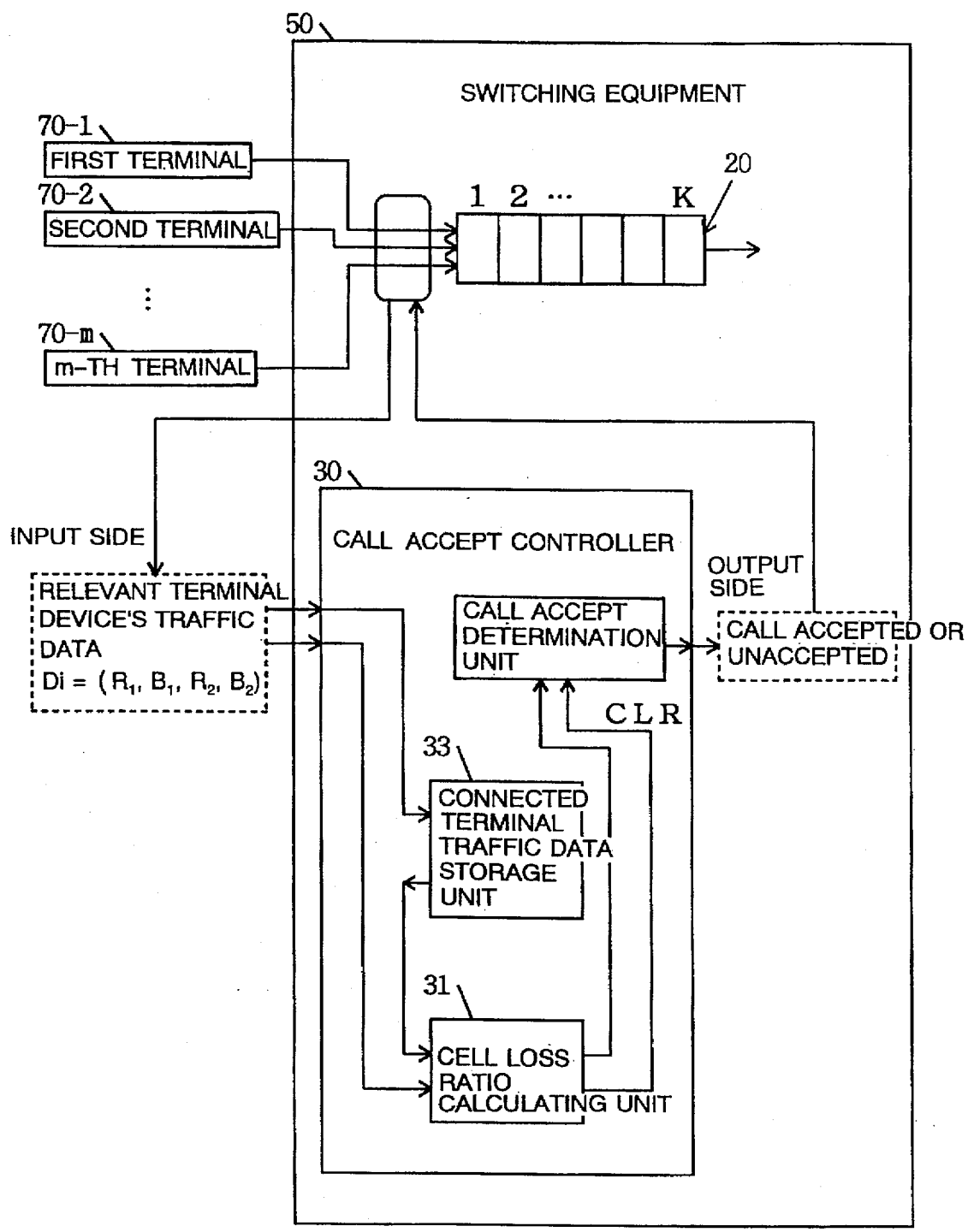
FIG. 6 is a block diagram illustrating a construction of the call accept controller in the first and second embodiments.

FIG. 6 is a block diagram illustrating a construction of the first embodiment. Now, the switching equipment 50 includes a buffer 20 for storing the call cells from a first terminal 70-1 through an m-th terminal 70-m defined as traffic sources. The switching equipment 50 also includes a call accept controller 30 for controlling a call receipt from the traffic source by calculating a call loss ratio of this buffer (Buffer 20)

The buffer 20 has a capacity enough to store K-pieces of cells. That is, the buffer 20 has a buffer length K.

(Call Accept Controller 30)

The call accept controller 30 is constructed of a connected terminal traffic data storage unit 33, a cell loss ratio calculation unit 31 and a call accept determination unit 32.

[Connected Terminal Traffic Data Storage Unit 33]

The connected terminal traffic data storage unit 33 stores, upon accepting a call accept request given from the terminal 70, the parameters ($R_1$, $B_1$, $R_2$, $B_2$) inputted as traffic data from the terminal 70.

[Cell Loss Ratio Calculation Unit 31]

Figure 7:
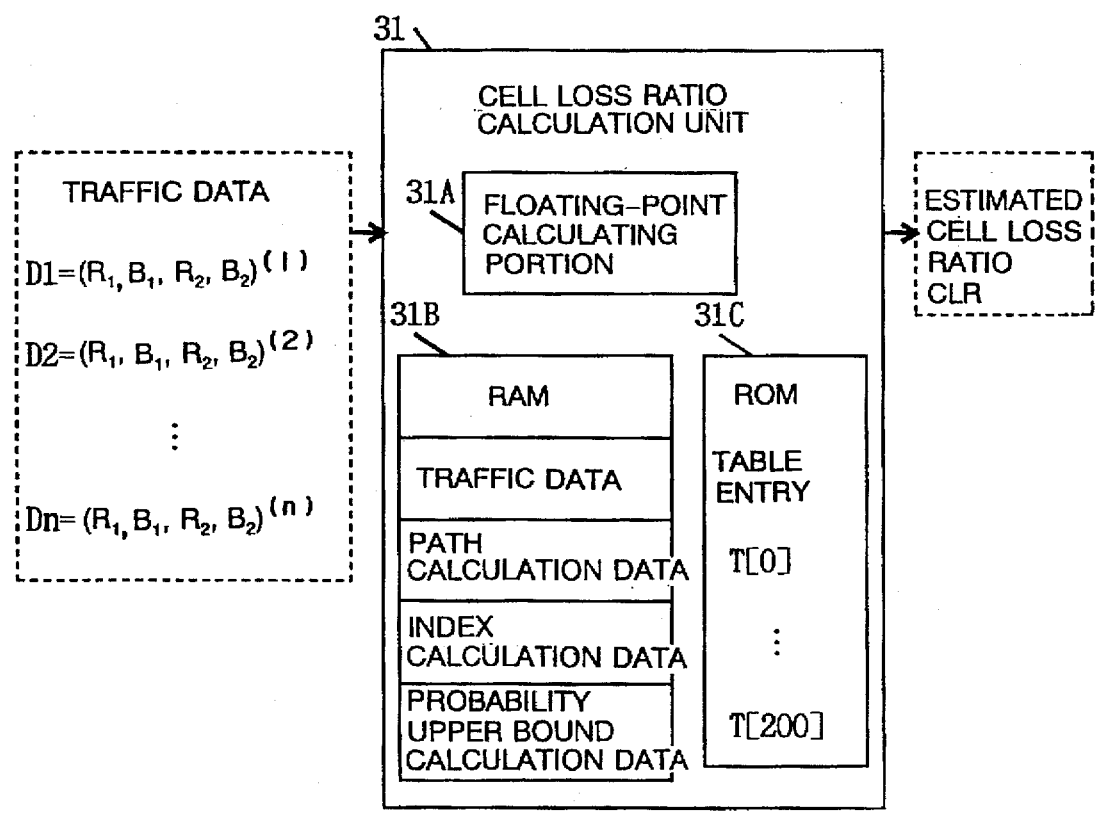
FIG. 7 is a diagram illustrating a configuration of a cell loss ratio calculating unit in the first embodiment.

The cell loss ratio calculation unit 31 is, as illustrated in FIG. 7, constructed of a RAM 31B, a ROM 31C and a floating-point calculating portion 31A. When a call accept request is issued from the terminal 70, the cell loss ratio calculation unit 31 receives an item of traffic data from the relevant terminal 70 and also receives the traffic data of the terminal 70 that has already accepted the call accept request from the connected terminal traffic data storage unit 33.

The RAM 31B stores the traffic data, an item of path calculation data, an item of index calculation data for accessing pieces of table data stored in the ROM 31C and an item of probability upper bound calculation data.

The ROM 31C stores a number-of-lost-cells expected value storage table (hereinafter simply called a table) 20 shown in FIG. 8.

The floating-point calculating portion 31A calculates (estimates) a cell loss ratio CLR on the assured side by use of the data stored in the table 20. Note that the calculation on the assured side implies an overestimation on the basis of a true cell loss ratio.

[Call Accept Determination Unit 32]

The call accept determination unit 32 compares a calculated value of the cell loss ratio CLR that is calculated by the cell loss ratio calculation unit 31 with a predetermined cell loss ratio fiducial value. The cell accept determination unit 32 determines whether or not the cell accept request issued from the traffic source is permitted on the basis of a result of this comparison.

<Principle, Theoretical Background of Cell Loss Ratio Calculation>

Given above is the explanation of how the cell loss ratio calculation unit 31 calculates the cell loss ratio, and yet the principle, in another term, a theoretical background of a method of calculating the cell loss ratio will be described.

First, the document (3) shows the formula (1-1) for evaluating the cell loss ratio on the assured side:

$$CLR \leq \sum_{k=0}^{\infty} [k-K]^+ p_1^* \ldots {}^*p_n(k) / \sum_{k=0}^{\infty} p_1^* \ldots {}^*p_n(k) \qquad (1\text{-}1)$$

where N is the number of calls to be multiplexed, K is the buffer length, the symbol $[k-K]^+$ represents $k-K$ when $k \geq K$ but 0 when $k<K$, the symbol (*) indicates a convolution, T is the maximum delay value when the cell passes the buffer 20, and $p_1, \ldots p_N$ indicates a probability distribution of the number of cells arriving within the time T from each traffic source in an equilibrated state.

The time T is given by the formula (1-2):

$$T = KL/C \qquad (1\text{-}2)$$

where C [bit/s] is the output velocity of an unillustrated output-side highway, and L [bit] is the number of bits per cell.

In the formula (1-1), it can be interpreted that the numerator is an expected value when the number of cells arriving within the tim T exceeds K, while the denominator is an expected value of the number of cells arriving within the same time T. Accordingly, the numeral (1-1) is equivalent to the formula (2):

$$CLR \leq E[[\zeta-K]^{30}]/E[\zeta] \qquad (2)$$

where $\zeta$ is the probability variable indicating the number of cells arriving within the time T from the traffic source in which the N-calls are multiplexed.

When using leaky bucket UPC, the following corresponding relationships are established by use of the traffic data of each traffic source.

$P_i = R_1$
$A_i = R_2$ where ($P_i$, $A_i$) (i=1, ..., N) are respectively the peak rate and the average rate of each traffic source that are restricted by the UPC. The denominator of the right side in the formula (2) is given by the formula (3).

$$E[\zeta] = T \cdot \sum_{i=1}^{N} A_i \qquad (3)$$

On the other hand, it is more difficult to evaluate the numerator of the right side of the formula (2) expressed by use of the convolution in the formula (1). With respect to ON/OFF burst traffic passing through a given LB parameter, however, the evaluation can be given by using the method explained in the documents (5) and (6).

Each traffic source presumed based on this method is expressed by a Markov model assuming ON/OFF two statuses, which is known as MMPP. The cell is generated at the peak rate $P_i$ in the ON-status, but no cell is generated in the OFF-status. There is a transition in terms of a probability between the ON- and OFF-statuses, and the average rate coincides with $A_i$.

In the documents (5) and (6), the multiplexed call status is expressed by a cell arrival ratio ($r_t$) at each timing t expressed by the Poisson distribution and a time variation thereof.

FIGS. 9(A) and 9(B) respectively show the time variations of the cell arrival ratio and a cell arrival ratio distribution $f(r_t)$. The cell arrival ratio distribution at an arbitrary timing t is fixed in the equilibrated state, and, in the case of the traffic source in the ON-OFF statuses, the cell arrival ratio distribution with respect to each traffic source i (i=1, ..., N) is expressed such as:

$$\theta_i(X) = A_i/P_i \text{ (when } x = P_i)$$

$$\theta_i(X) = 1 - A_i/P_i \text{ (when } x = 0)$$

Hence, the cell arrival ratio distribution in the case of being multiplexed is calculated by the formula (4).

$$f(r_t) = \theta_1 * \ldots * \theta_N(x = r_t) \quad (4)$$

Particularly, if the peak rates and the average rates of all the traffic sources are equal, the formula (4) expresses a binomial distribution.

Figure 9:
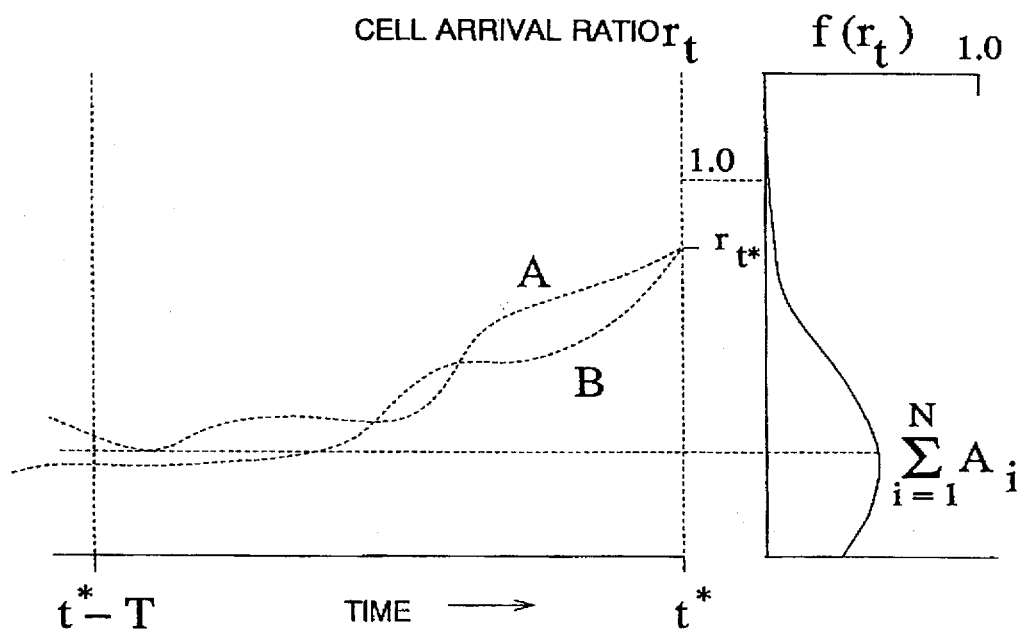
FIG. 9 is a diagram showing a relationship between time-variations in a cell arrival ratio and a cell arrival ratio distribution.

Referring to FIG. 9, an average of the cell arrival ratio distribution coincides with a sum of the average rates of the respective traffic sources, the sum being given by:

$$\sum_{i=1}^{N} A_i$$

FIG. 9(A) illustrates two different time-series (paths) A and B representing time variations of the cell arrival ratio. The arrival ratio of each path is obtained from a calculation with respect to each traffic type by the method explained in the document (1), wherein a number-of-cell-arrivals distribution per unit time U=L/C needed for outputting a single piece of cell is expressed by the Poisson distribution. As a result, the number-of-cell-arrivals distribution for each unit time t is calculated on the assured side on the basis of the Poisson distribution using the cell arrival ratio $r_t$ and given by:

$$P(k;m) = m^k e^{-m}/k!$$

where $m = r_t$, and k is the number of cell arrivals. The cell arrival ratio time-changes depending on the ON/OFF statuses of each traffic source. The paths A and B in FIG. 9 illustrate such two examples. Each Poisson distribution is integrated with respect to each path, thereby obtaining the number-of-cell-arrivals distribution from a timing t*–T to a timing t* (hereinafter expressed such as (t*–T, t*).

When paying attention to the fact that the integration of the Poisson distribution is expressed by the sum of the parameters, a distribution of the number-of-arrivals $\zeta_A$ during a (t*–T, t*) period with respect to the path A is given by:

$$f(\zeta_A = k) = (m_A)^k e^{-m_A}/k! \quad (5)$$

Herein, $m_A$ is expressed such as:

$$m_A = \sum_{t=t^*-T+1}^{t^*} r_t \quad (6)$$

Evaluating the formula (2) in the equilibrated state entails calculating the formula (5) with respect to all such paths and taking an average thereof. That is, the numerator of the right side in the formula (2) is calculated as follows by use of the formula (5):

$$E[[\zeta - K]^+] = \int_X [\zeta_X - K]^+ f(X) = \quad (7)$$

$$\int_X \left( \sum_{k=K} (k-K) \cdot \frac{(m_X)^k}{k!} e^{-m_X} \right) \cdot f(X)$$

where $f(X)$ is the generation probability of a path X, $\zeta_X$ is the probability variable representing the number-of-cell-arrivals for the time T with respect to the path X, and $m_X$ is the quantity of the path X corresponding to $m_A$ in the formulae (5) and (6). Herein, in the rightmost side in the formula (7), a value of function taking an expected value is determined from the buffer length K and $m_X$ representing the number-of-cell-arrivals in the Poisson distribution.

$$L_X = \sum_{k=K} (k-K)(m_X)^k e^{-m_X}/k! \quad (8)$$

When paying attention to the fact that K is determined when designing the system, and if K is fixed, it follows that the formula (7) is easily calculated by preparing a table where $m_X$ as shown in FIG. 8 is a parameter. Note that a table of FIG. 8 shows a case when K=128.

On the occasion of preparing the table as shown in FIG. 8, it is of importance to adequately keep a trade-off between a size of the table and an accuracy thereof. The formula (8) is asymptotically expressed such as:

$$L_X = 0 \text{ (when } m_X \ll K)$$

$$L_X = m_X - K \text{ (when } m_X \gg K)$$

Hence, the table is prepared with an accuracy corresponding to the size of the table, wherein a range with $m_X$ and K being proximal to each other is centered. In the case of FIG. 8, the number of entries is 200, and the unit of each table is given by K/100=1.28. When calculating $L_X$ with respect to given $m_X$, an index of the table is calculated by:

$$I = \left[ \frac{m_x}{u} \right] \quad (9)$$

and obtained from:

[Formula 16]

$$L_X = T[I] \text{ (when } I < S)$$

$$L_X = m_X - K \text{ (when } I \geq S) \quad (10)$$

where S is the size of the table, u is the unit of the table, and T[I] is each entry of the table.

<Method of Calculating Cell Loss ratio in First Embodiment>

As a matter of fact, it is difficult to calculate the formula (7) with respect to all the paths because of a large number of paths. Then, the first embodiment adopts a cell loss ratio calculation method which follows, and a calculation quantity is thereby reduced.

Figure 13:
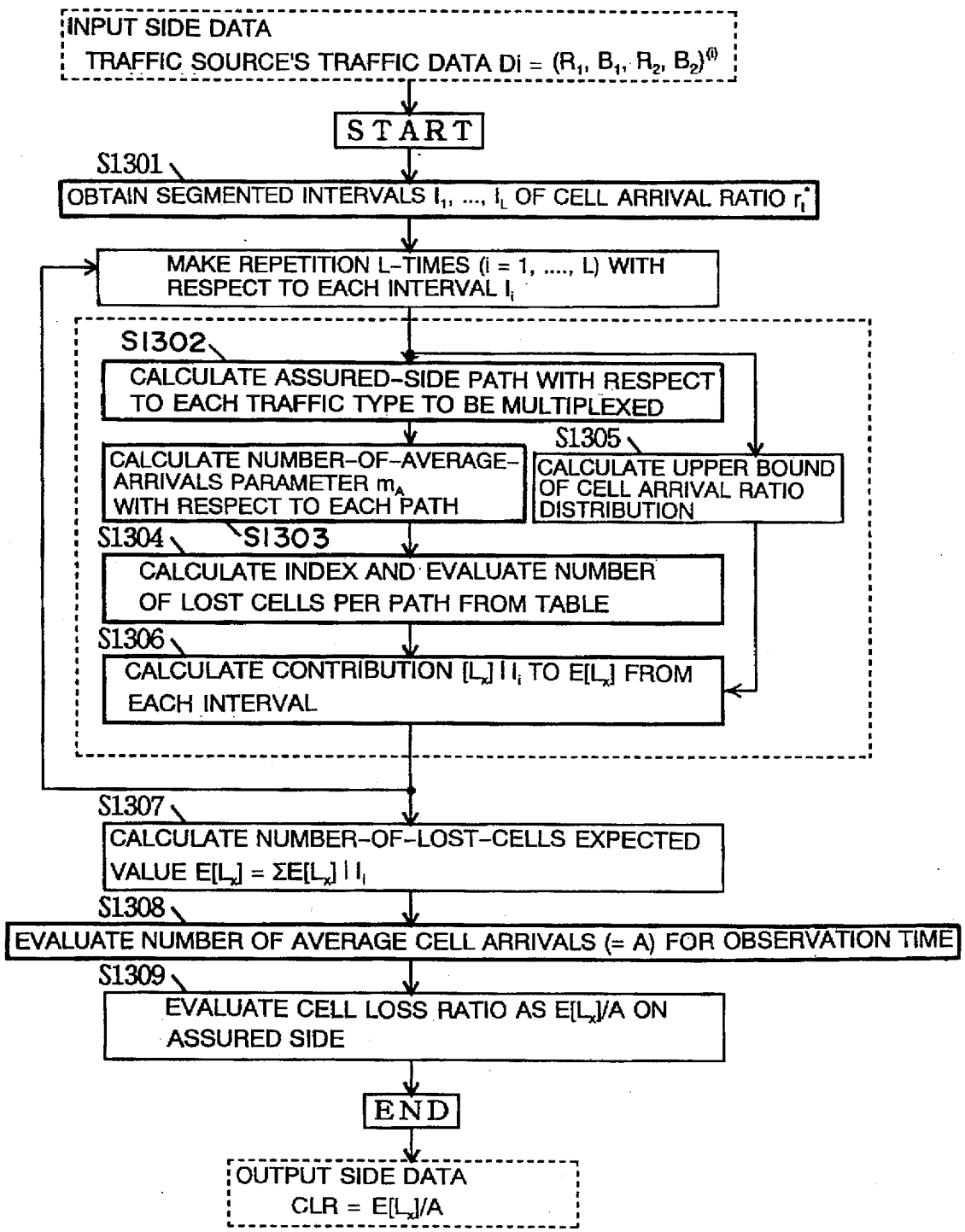
FIG. 13 is a processing flowchart for calculating a cell loss ratio in the first embodiment.

FIG. 13 shows a processing flow of calculating the cell loss ratio in the first embodiment. As shown in FIG. 13, this processing flow consists of processing steps 1301–1310. Each processing step will hereinafter be explained.

(Processing Step 1301)

Figure 14:
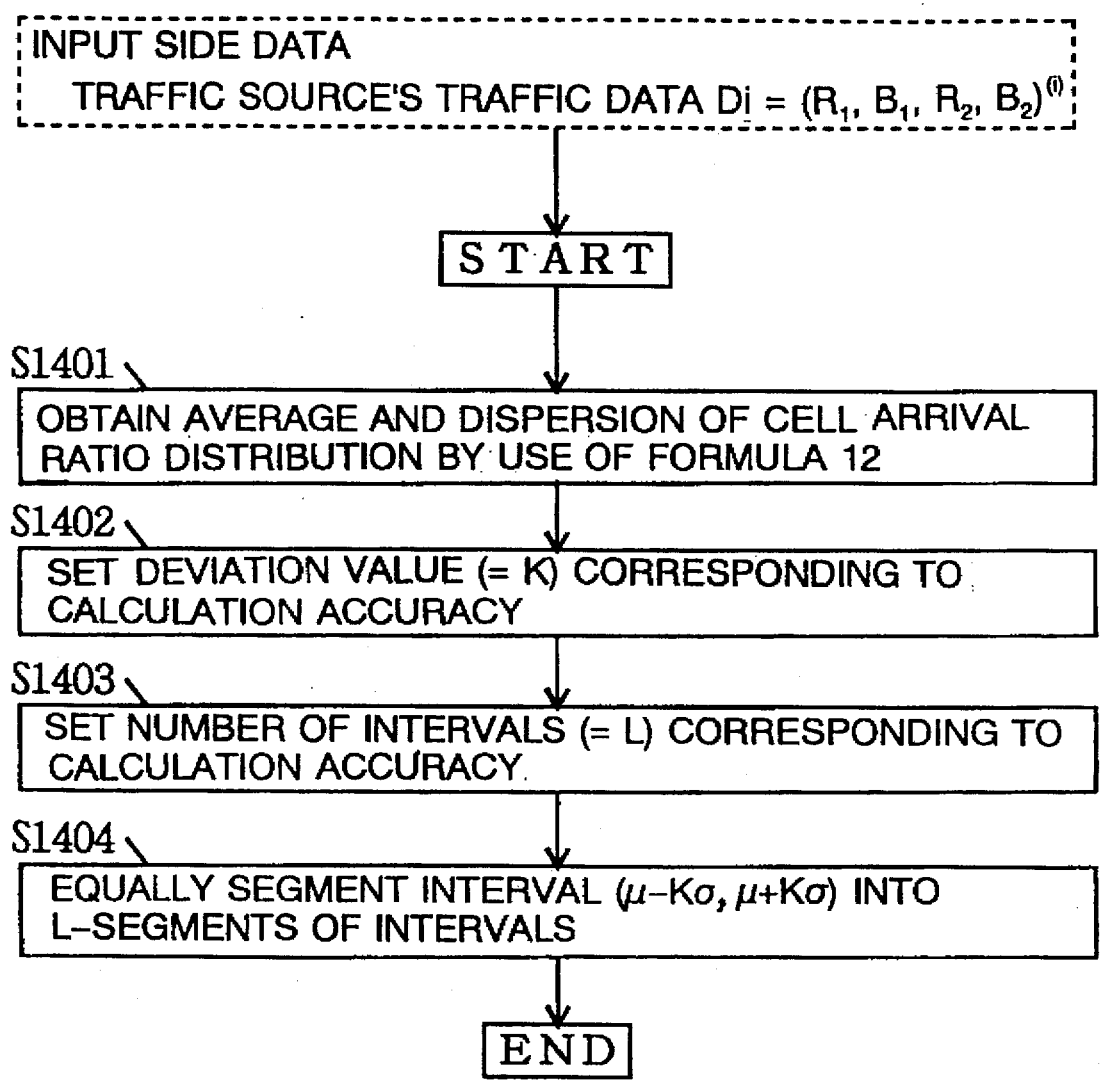
FIG. 14 is a detailed processing flowchart of processing step 1301 of FIG. 13, i.e., an interval segmentation.

Processing step 1301 is a step of segmenting a cell arrival ratio $r_t^*$ into L-segments of intervals $I_1, \ldots, L_L$, but, specifically, this is actualized in processing steps 1401–1404 shown in FIG. 14.

To start with, in processing step 1401, an average μ of the cell arrival ratio distribution is calculated by the formula (11-1), and a dispersion o of the above distribution is calculate by the formula (11-2).

$$\mu = \Sigma_i A_i = \Sigma_i R_2^{(i)} \qquad (11\text{-}1)$$

$$\sigma = (\Sigma_i (P_i - A_i)^2)^{1/2} = (\Sigma_i (R_1^{(i)} - R_2^{(i)})^2)^{1/2} \qquad (11\text{-}2)$$

where $R^{1(i)}$, $R_2^{(i)}$ are the parameters of the leaky bucket for specifying the traffic of each traffic source.

Next, in processing step S1402, a deviation value (=K) corresponding to a calculation accuracy is set. K is set to, e.g., 5.0.

Subsequently, in processing step 1403, the number of intervals (=L) corresponding to the calculation accuracy is set. L is set to, e.g., 80.

Next, in processing step 1404, a range of $(\mu - K \cdot \sigma, \mu + K \cdot \sigma)$ is segmented at an equal interval into L-segments of sub-ranges.

Note that an improvement of the calculation accuracy is expected by increasing K and L, but a calculation time also increases.

(Processing Step 1302)

Processing step 1302 is a step of calculating an assured-side path of each traffic type to be multiplexed on the basis of the traffic data of each traffic source and an segmented interval $I_i = (Y_i, Y_{i+1})$. Specifically, this is actualized in processing steps 1501–1503 shown in FIG. 15.

At first, in processing step 1501, a time constant $T_0^{(J)}$ is calculated by the formula (12) with respect to each traffic type J (J=1, ..., S), and also a cell arrival ratio $Y_{i+1}$ is calculated by the formula (13) with respect to the given interval. Note that each of all the traffic sources contained in the traffic data belongs to one of the traffic types J.

$$T_0^{(J)} = B_2/(R_1 - R_2) \qquad (12)$$

$$Y_{i+1} = \sum_{J=1}^{S} a^{(J)} \qquad (13)$$

where $a^{(J)}$ represents an expected value of the cell arrival ratio calculated by a large deviation theory method as well as by the method stated in the document (1) under such condition that $r_{i*} = Y_{i+1}$.

Next, in processing step 1502, the assured-side path for every traffic type is calculated by use of the time constant $T_0^{(J)}$ for every traffic type and the cell arrival ratio $a^{(J)}$ as well. For calculating the assured-side path, the cell arrival ratio $r_i^*$ of the relevant interval is, it may be presumed, a maximum value $Y_{i+1}$ ($Y_{i+1} > Y_i$) expected in the interval.

In the case of including the plurality of traffic types, the cell arrival ratio changes depending on a combination of these traffic types, and it is therefore necessary to consider all such combinations that the cell arrival ratio is contained in the relevant interval (as a result of the combination thereof). As one example, when considering two traffic types $D_0 = (P_0, A_0) = (0.1, 0.05)$, $D_1 = (P_1, A_1) = (0.2, 0.05)$, there are two ways $3P_0$, $P_0 + P_1$ for the combination to actualize $r_i^* = 0.3$.

When obtaining an average path, however, there is no necessity for considering all such combinations. There may be obtained an expected value of the cell arrival ratio of each traffic type in an average combination. That is, there may be obtained the expected value of the cell arrival ratio of each traffic type under such a condition that $r_i^* = Y_{i+1}$.

A method of obtaining the expected value of the cell arrival ratio by use of a normal distribution is written in the document (1). Further, the expected value of the cell arrival ratio of each traffic type for giving the cell arrival ratio $Y_{i+1}$ can be immediately obtained also by the large deviation theory stated on pp. 188–193 of "Information Theory and Reliable Communications", written by R. G. Gallager, John Wiley and Sons, 1968 (hereinafter termed a document (8)).

Note that the average path is a concept introduced for sets of a multiplicity of paths vicinal to each other in the documents (5) and (6) and is obtained by averaging transitions of the cell arrival ratio corresponding to a target set ([a, b]).

Figure 11:
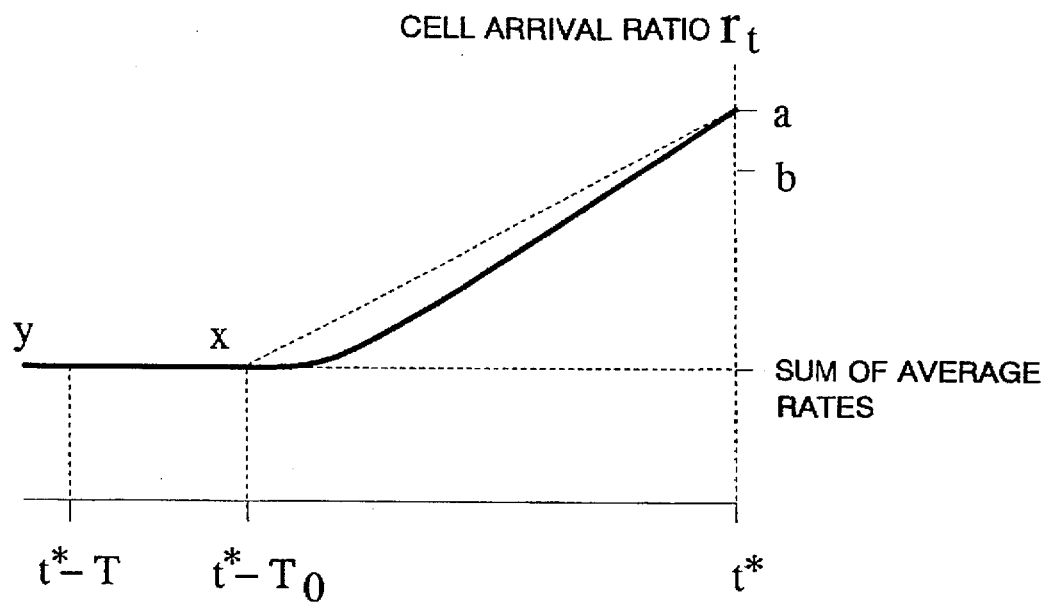
FIG. 11 is a diagram illustrating an average path and time-variations in the cell arrival ratio when $T>T_o$ in the first embodiment.
Figure 12:
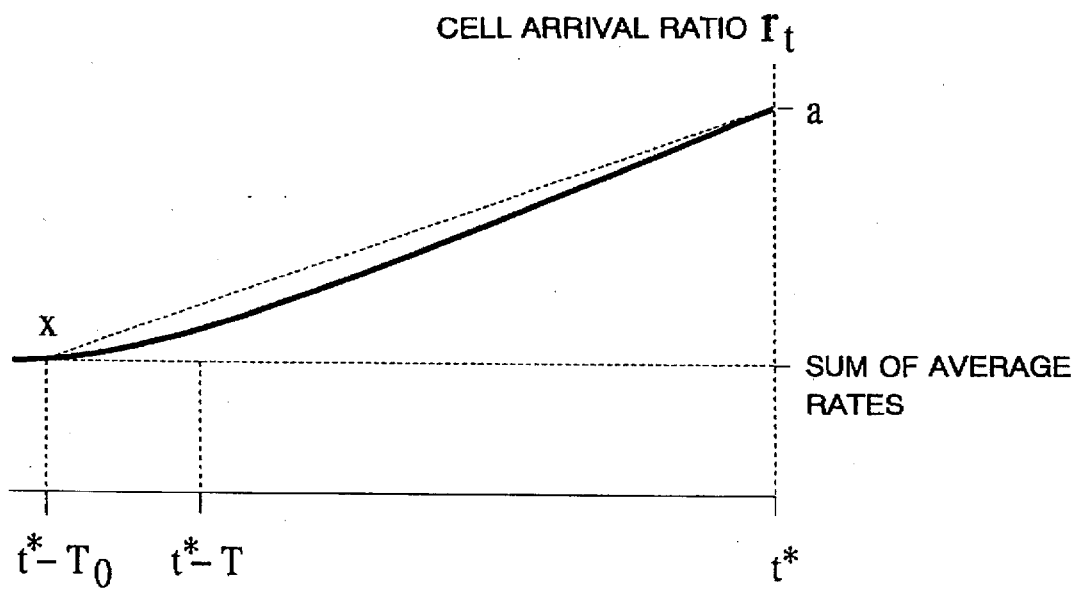
FIG. 12 is a diagram illustrating the average path and the time-variations in the cell arrival ratio when $T \leq T_o$ in the first embodiment.

FIGS. 11 and 12 show time-variations of the cell arrival ratio, and the average path is drawn by a solid line in these Figures. It can be understood especially from FIG. 11 that the average path converges at a sum of the average rates in a point (point y in FIG. 11) well posterior from t*.

Herein, the average path can be calculated from the Markov model of the ON/OFF traffic source, but this involves a good deal of calculations. For this reason, the documents (5) and (6) describe a method of obtaining a path (corresponding to ax in FIGS. 11 and 12) on a more assured side than the average path by making use of the UPC parameters instead of calculating the average path. The straight line ax corresponds to the fact that the traffic source in a burst-ON status consumes tokens in the leaky bucket and is thereby terminated, and it follows that this returns to the average rate within a fixed time ($T_0$) determined by a size of the bucket.

Figure 15:
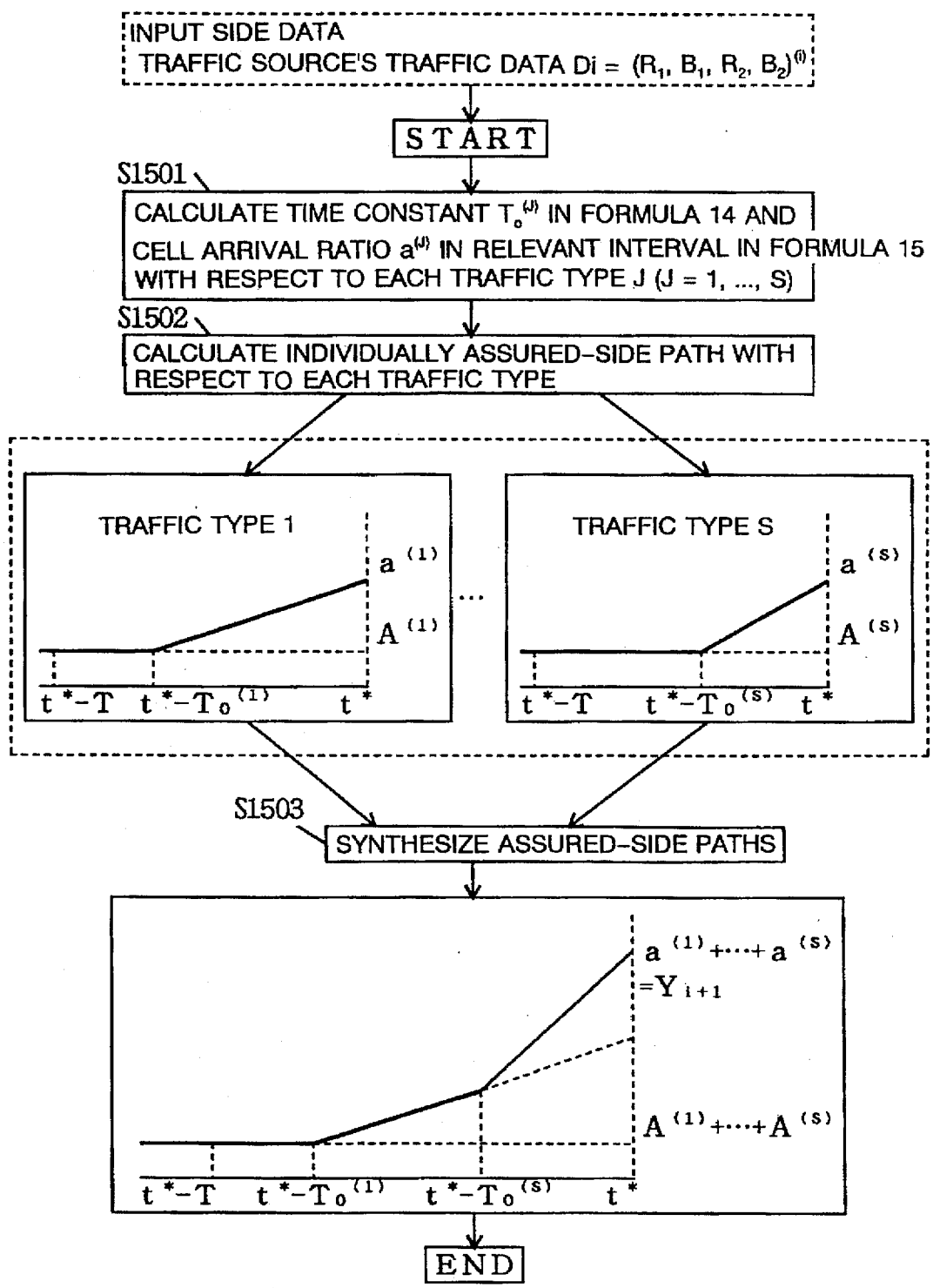
FIG. 15 is a detailed processing flowchart of processing step 1302 of FIG. 13, i.e., a path on an assured side.

Next, in processing step 1303; the assured-side path with respect to the interval $I_i$ is obtained by synthesizing the assured paths for every traffic type. Referring to FIG. 15, $A^{(J)}$ designates a sum of the average rates of the respective traffic types. That is, let $A_i$ be the average rage of each traffic source i, $A^{(J)}$ is given by a sum of $A_i$ with respect to all the traffic sources i belonging to the traffic types J.

(Processing Step 1303)

Figure 16:
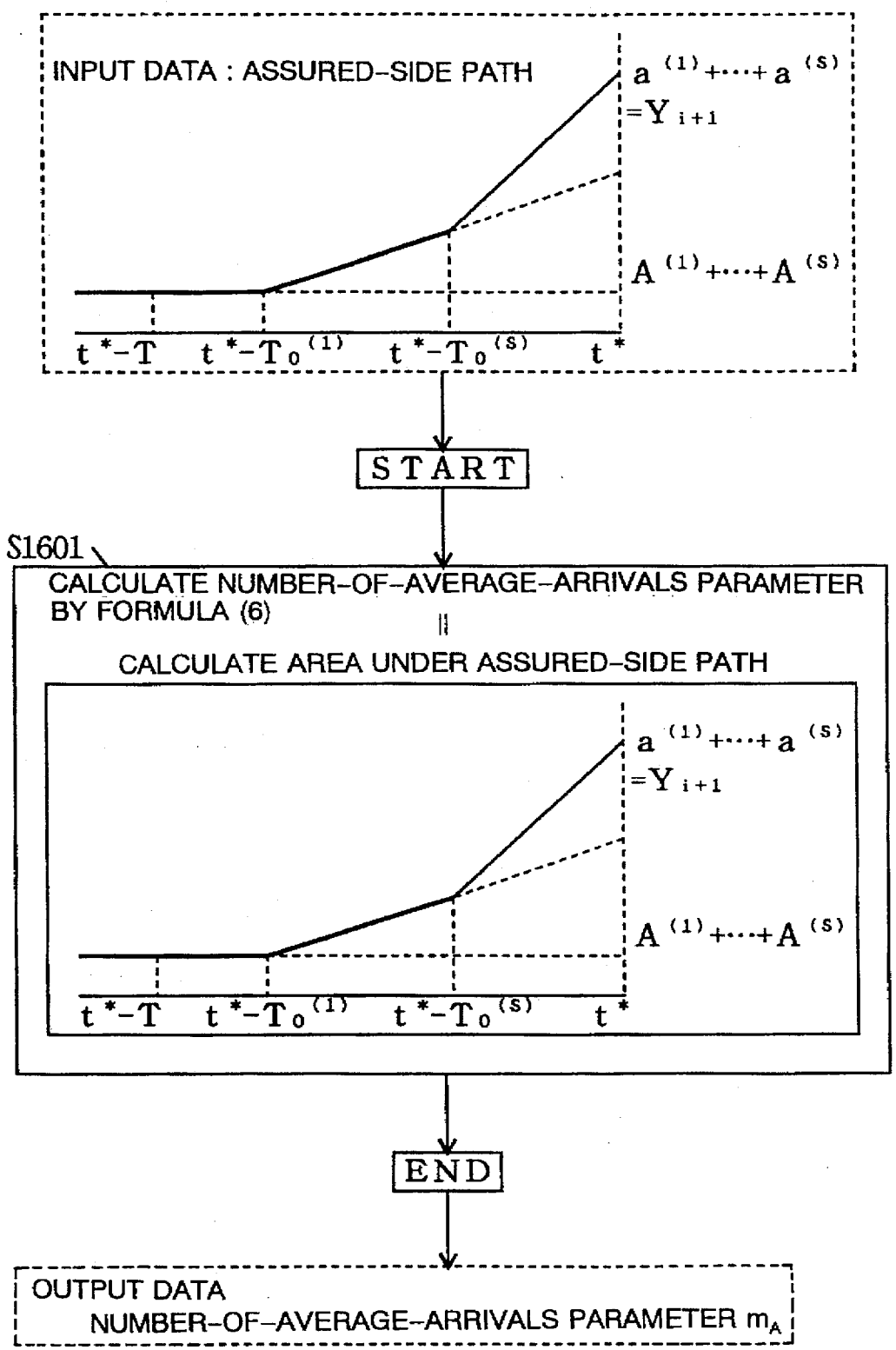
FIG. 16 is a detailed processing flowchart of processing step 1303 of FIG. 13.

Processing step 1303 is a step of calculating a number-of-average-arrivals parameter relative to the assured-side path calculated in processing step 1302. Specifically, this is actualized in processing step 1401 shown in FIG. 16.

In processing step 1401, a number-of-average-arrivals parameter $m^A$, which is to be originally calculated by the formula (6), is obtained by calculating an area defined by an oblique line portion under the assured-side path. The reason why the above parameter is thus obtained is that the formula (6) gives an integral value of the (t*-T)-to-(t*) interval.

Next, taking the assured-side path calculating method in processing step 1302 into consideration, the assured-side path is obtained by performing synthesization with an addition of the assured-side path for every traffic type, and, hence, the number-of-average-arrivals parameter $m^A$ is, after individually calculating parameters $m^{A(J)}$ (J=1, ..., S) with respect to the assured-side paths of the respective traffic types, given as below.

$$m^A = \Sigma_{J=1} 1^* m^{A(J)} \qquad (14)$$

(Processing Step 1304)

Figure 17:
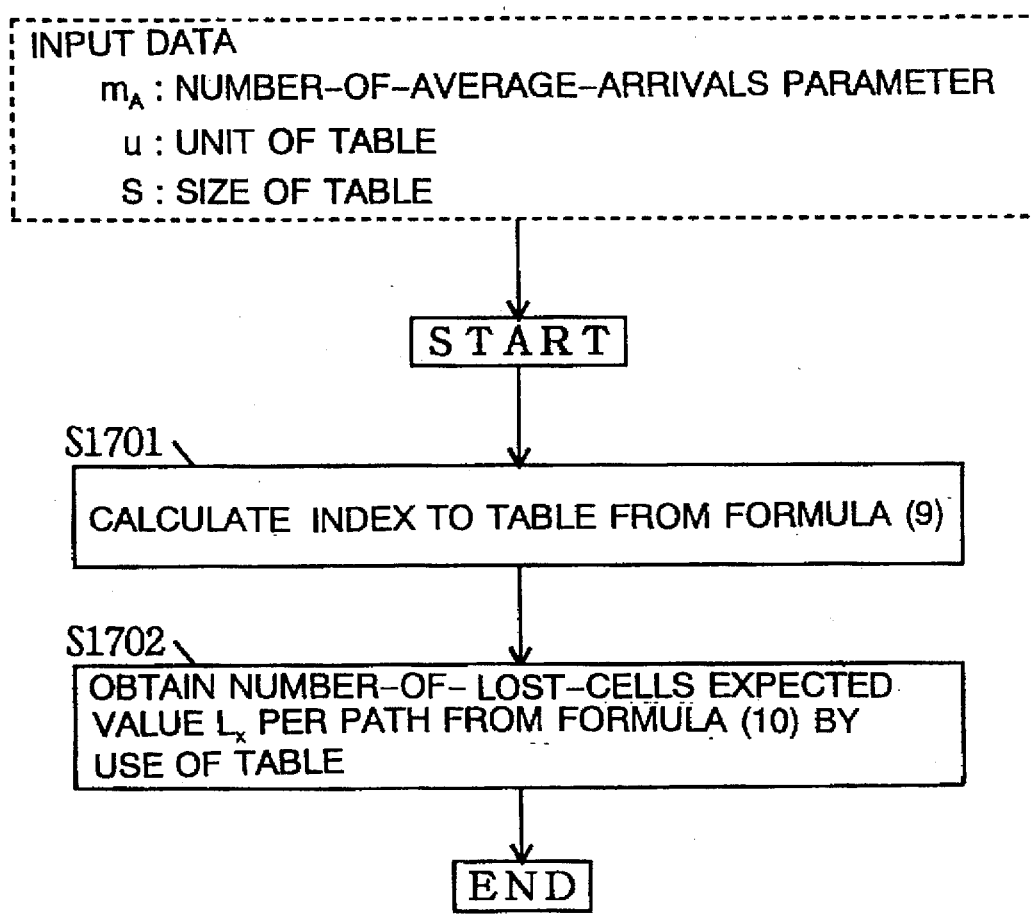
FIG. 17 is a detailed processing flowchart of processing step 1304 of FIG. 13.

Processing step 1304 is a step of evaluating the number-of-lost-cells per path. Specifically, this is actualized in processing steps 1701–1702 shown in FIG. 17.

To begin with, in processing step 1701, an index to the above table is calculated based on the formula (9) by use of the number-of-average-arrivals parameter $m^A$ and the table unit illustrated in FIG. 8.

Next, in processing step 1702, a number-of-lost-cells expected value $L_X$ for every path is obtained from the formula (10) by making use of the above table.

(Processing Step 1305)

Processing step 1305 is a step of calculating an upper bound of the cell arrival ratio distribution.

Herein, an upper bound F(x) of the cell arrival ratio distribution is defined by:

$$F(x) \leq \bar{F}(x) \text{ for } \forall x$$

The formula (16) is evaluated on the assured side.

$$E[L_x] \leq E[\bar{L}_x] = \ldots + E[[\zeta_{ab} - K]^+] \cdot (\bar{F}(a) - \bar{F}(b)) + \quad (15)$$
$$E[[\zeta_{bc} - K]^+] \cdot (\bar{F}(b) - \bar{F}(c)) + \ldots$$

Note that a cell arrival ratio distribution upper bound fast calculating method using the normal distribution is explained in the document (1). Further, an upper bound calculating method using the large deviation theory is described in the document (8).

(Processing Step 1306)

Figure 18:
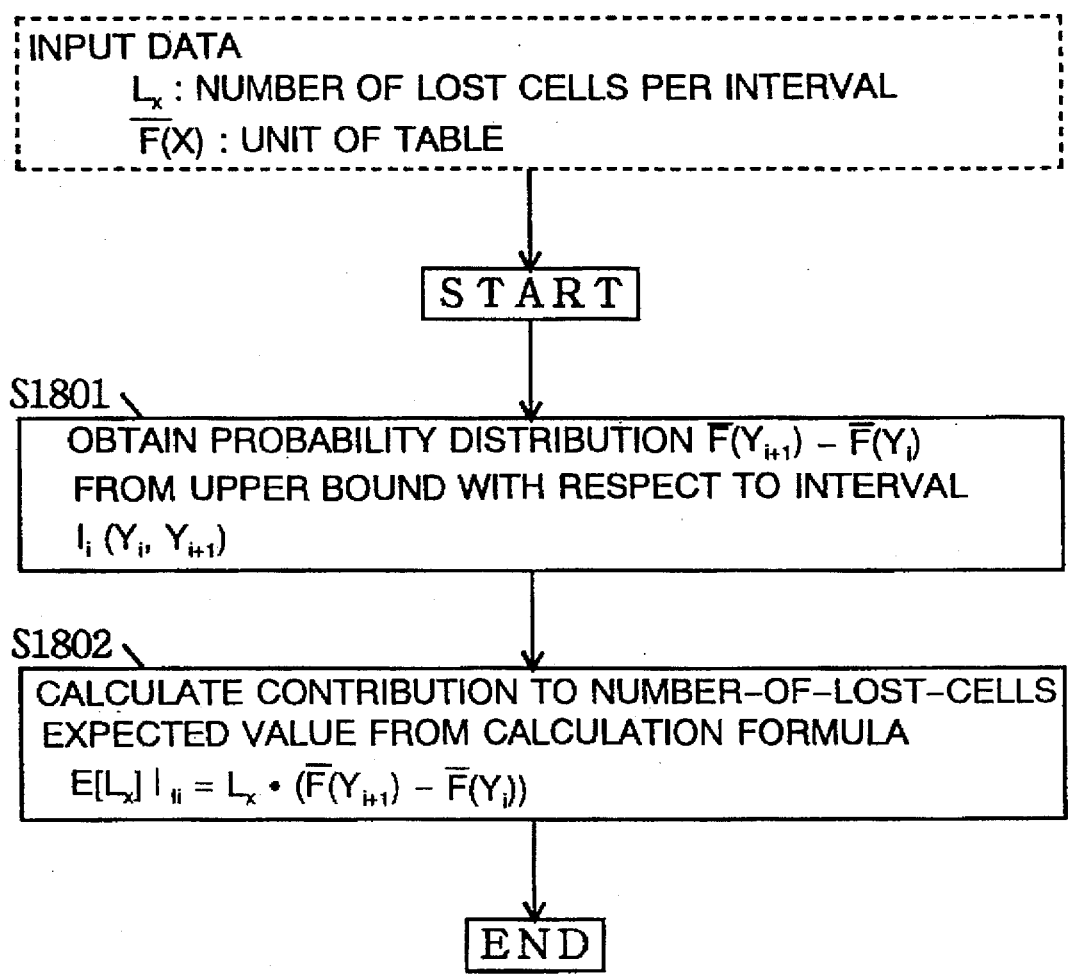
FIG. 18 is a detailed processing flowchart of processing step 1306 of FIG. 13.

Processing step 1306 is a step of calculating a contribution to a number-of-lost-cells expected value from the respective intervals. Specifically, this is actualized in processing steps 1601–1602 shown in FIG. 18.

First, in processing step 1601, a probability distribution is obtained from the upper bound with respect to the interval $I_i = (Y_i, Y_{i+1})$ $$F(Y_{i+1}) - F(Y_i)$$

Next, in processing step 1602, a contribution to the number-of-lost-cells expected value is obtained by:

$$E[L_x]|_{I_i} = L_x \bar{F}(Y_{i+1}) - \bar{F}(Y_i)$$

Figure 10:
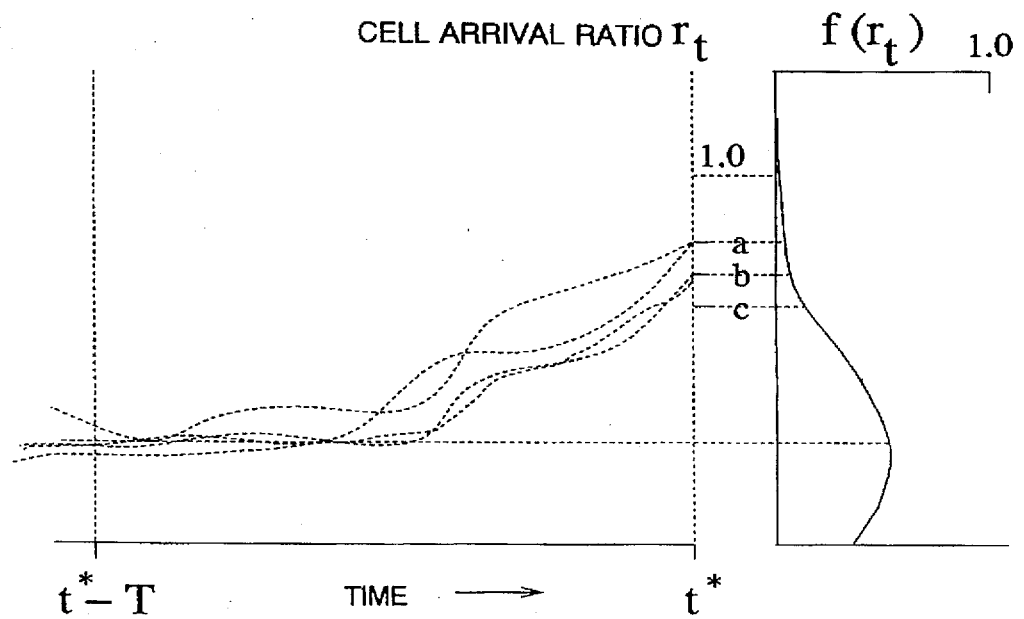
FIG. 10 is a diagram illustrating a calculation principle of an expected value $E[\zeta]$ of the number of cell arrivals in the first embodiment.

Referring to FIG. 10, the expected value $E[L_x]$ of $L_x$ with respect to sets $\{a_{li}\}$ of all the paths can be calculated by:

$$E[L_x] = \ldots + E[[\zeta_{ab} - K]^+] \cdot (F(a) - F(b)) + \quad (16)$$
$$E[[\zeta_{bc} - K]^+] \cdot (F(b) - F(c)) + \ldots$$

where $E[\zeta_{ab}]$, $E[\zeta_{bc}]$ are the expected values with respect to $\zeta$ respectively from the intervals $I_{ab}$ and $I_{bc}$, and $F(x)$ is the accumulation distribution function of the cell arrival ratio distribution $f(r_i)$.

Where contributions to the formula (16) respectively from the intervals $I_{ab}$, $I_{bc}$ are expressed especially by $E[L_x]|I_{ab}$, $E[L_x]|I_{bc}$, the formula (16) is expressed such as:

$$E[L_x] = \ldots + E[L_x]|I_{ab} + E[L_x]|I_{bc} + \ldots$$

Herein, this turns out:

$$E[L_x]|I_{ab} = E[[\zeta_{ab} - K]^+] \cdot (F(a) - F(b))$$

$$E[L_x]|I_{bc} = E[[\zeta_{bc} - K]^+] \cdot (F(b) - F(c))$$

By the way, when including the plurality of traffic sources, the assured-side path corresponding to that in FIG. 10 is independently calculated, and there is added the number-of-average-arrivals parameter expressed by the formula (6). A number-of-average-arrivals parameter when multiplexed can be thereby obtained, and, from this parameter, the number-of-lost-cells expected value (formula (7)) can be immediately evaluated based on the formula (8).

Note that T>T₀ in FIG. 11, but this relationship is not necessarily established. FIG. 12 illustrates an example where T≦T₀. In this case also, the calculation can be performed absolutely in the same manner by use of assured-side ax.

(Processing Step 1307)

In processing step 1307, the number-of-lost-cells expected value $E[L_x]$ is calculated by adding the contribution $E[L_x]|I_i$ calculated in processing step 1306. That is, the calculation is made as follows:

$$E[L_x] = \Sigma E[L_x]|I_i$$

(Processing Step 1308)

Figure 19:
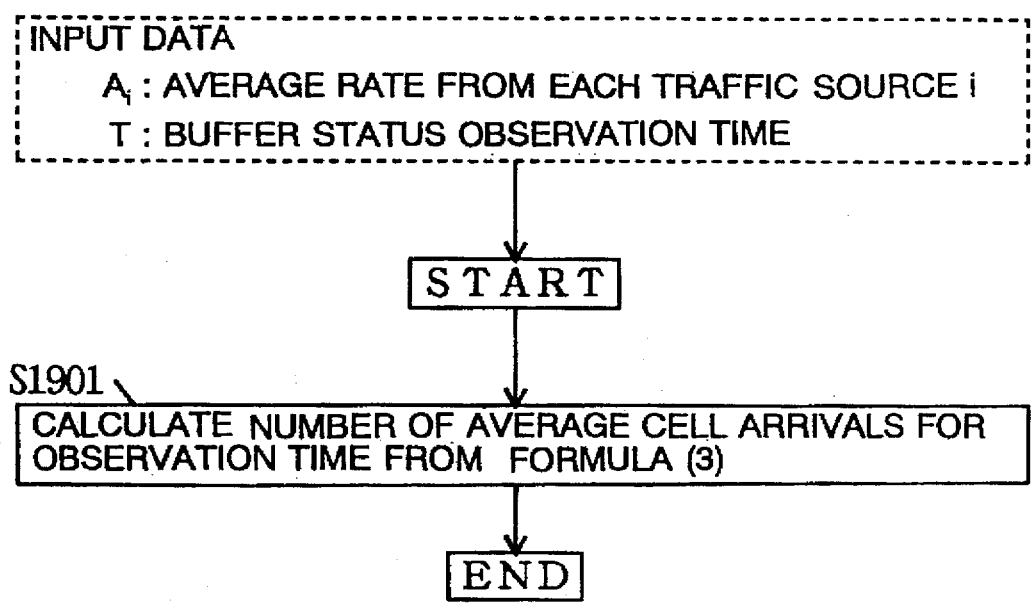
FIG. 19 is a detailed processing flowchart of processing step 1308 of FIG. 13.

Processing step 1308 is a step of evaluating a number-of-average-cell-arrivals (=A) during an observation time. Specifically, this is actualized in processing step 1901 shown in FIG. 19.

To start with, in processing step 1901, the number-of-average-cell-arrivals (=number-of-cell-arrivals expected value) during an observation time T by use of the formula (3) on the basis of the buffer status observation time T and an average rate $A_i$ (i=1, . . . , n) from each traffic source.

(Processing Step 1309)

Processing step 1309 is a step of evaluating the cell loss ratio in the form of $E[L_x]/A$ on the assured side. Accordingly, a value of $E[L_x]/A$ is outputted as the cell loss ratio CLR.

(2) Second Embodiment

<Outline of Second Embodiment>

A second embodiment is concerned with the call accept controller. The call accept controller, when requests for accepting the calls are given from the plurality of traffic sources, compares the value obtained by calculating the cell loss ratio of the buffer for storing call ATM cells (hereinafter simply referred to as cells) on the assured side (overestimation) with the predetermined cell loss ratio fiducial value and, on the basis of a result of this comparison, controls the call accept request.

This call accept controller is provided as one function within the switching equipment but may be provided in the form of an addition to the switching equipment.

<Network Environment in Second Embodiment>

FIG. 5 is the diagram illustrating the network environment in the second embodiment. As illustrated in FIG. 5, the four sets of switching equipments 50 are connected via the transmission paths 80 to the cross connect device 60. Then, the two or three terminals 70 are connected via the transmission paths 80 to each switching equipment 50. Note that an arbitrary number of switching equipments 40 may be provided without being limited to 4. Further, an arbitrary number of terminals 70 may also be connected.

Then, the terminal 70 transmits the parameters ($R_1$, $B_1$, $R_2$, $B_2$) as traffic data representing characteristics of the traffic source as well as transmitting parameters (SCR, PCR, MBS and SCR, $T_{ob}$) to the switching equipment 50.

Herein, the parameters ($R_1$, $B_1$, $R_2$, $B_2$) are stated in the document (7), wherein the leaky bucket algorithm explained in CCITT Recommendation L371, "Traffic Control and Congestion Control in B-ISDN", June, 1992 (hereinafter termed a document (9)) is expressed by the token. Then, the leaky bucket (LB) is defined as a virtual buffer having a reading speed R and a buffer length B. The peak rate is specified based on the couple of parameters ($R_1$, $B_1$), while the average rate is specified based on another couple of parameters ($R_2$, $B_2$).

Further, the parameters (SCR, PCR, MBS/SCR, $T_{ob}$) are explained in the document (1), wherein the parameter SCR represents an average rate, PCR denotes a peak rate, MBS/SCR designates a maximum burst length, and $T_{ob}$ represents an observation time. Then, the parameters SCR, PCR are individually expressed by the number of cells to be observed within the time $T_{ob}$. Further, MBS represents a maximum number of cells that can be consecutively sent at the peak cell rate. Those parameters are defined in ATM Forum, UNI Specification Ver. 3.0, 1993 (hereinafter termed a document (14)) and Bellore, GR-1110-CORE DRAFT1, August 1994 (hereinafter termed a document (15)).

By the way, a cell interval $T_p$ when generated at the peak rate is given by:

$$T_p = T_{ob} * PCR / V_{Link}$$

where $V_{Link}$ is the link velocity. Further, a cell interval $T_s$ when generated at the average rate is given by:

$$T_s = T_{ob} * SCR / V_{Link}$$

Figure 21:
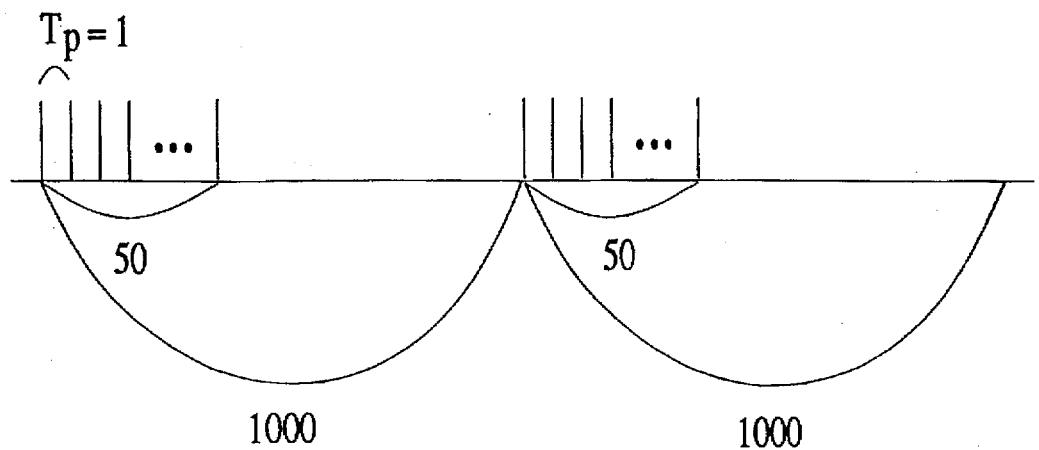
FIG. 21 is a diagram illustrating a passage pattern (part 1) of a leaky bucket in the second embodiment.
Figure 22:
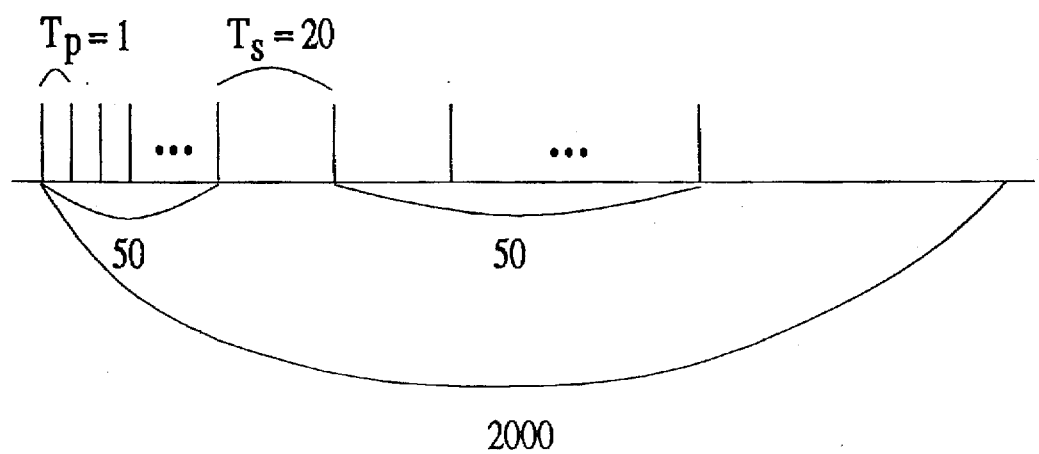
FIG. 22 is a diagram illustrating a passage pattern (part 2) of the leaky buck in the second embodiment.

FIGS. 21 and 22 illustrate examples of a passage pattern when MBS=100, SCR=100, PCR=2000, $V_{Link}$=2000, and $T_{ob}$=1.0[S]. Particularly, FIG. 21 illustrates an example where there exist two sets of MBS-cells continuous bursts at the peak rate. FIG. 22 illustrates an example where 50 pieces of cells are sent at the average rate after the MBS-cells continuous burst. Note that the numerical values in the Figures are based on the unit of a time for which a single piece of cell is sent from an output link.

<Construction of Second Embodiment>

FIG. 6 is the block diagram illustrating a construction of the second embodiment. Now, the switching equipment 50 includes the buffer 20 for storing the call cells from the first terminal 70-1 through the m-th terminal 70-m defined as traffic sources. The switching equipment 50 also includes the call accept controller 30 for controlling the call receipt from the traffic source by calculating the call loss ratio of this buffer 20.

(Buffer 20)

The buffer 20 has the capacity enough to store K-pieces of cells. That is, the buffer 20 has the buffer length K.

(Call Accept Controller 30)

The call accept controller 30 is constructed of a connected terminal traffic data storage unit 33, a cell loss ratio calculation unit 31 and a call accept determination unit 32.

[Connected Terminal Traffic Data Storage Unit 33]

The connected terminal traffic data storage unit 33 stores, upon accepting the call accept request given from the terminal 70, the parameters ($R_1$, $B_1$, $R_2$, $B_2$) inputted as traffic data from the terminal 70.

[Cell Loss Ratio Calculation Unit 31]

Figure 20:
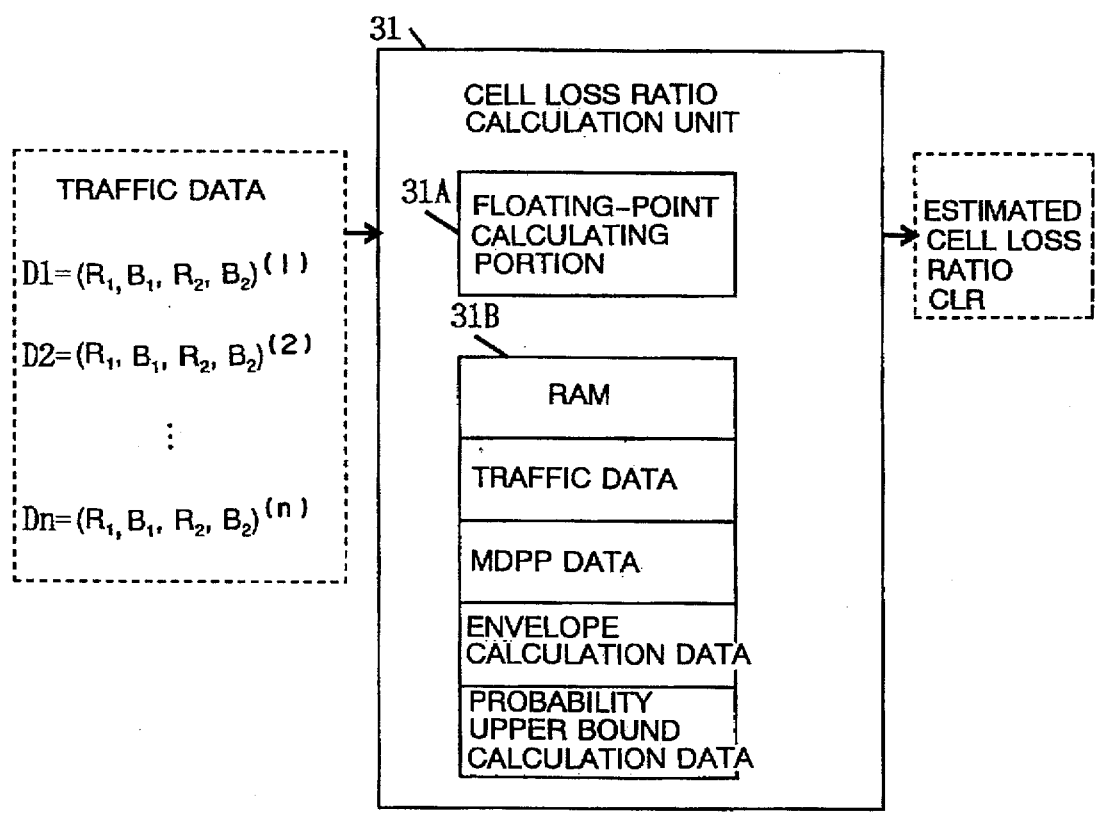
FIG. 20 is a diagram illustrating a configuration of a cell loss ratio calculation unit in the second embodiment.

The cell loss ratio calculation unit 31 includes, as illustrated in FIG. 20, the floating-point calculating portion 31A and the RAM 31B.

The floating-point calculating portion 31A inputs, when the call accept request is issued from the terminal 70, the traffic data ($R_1$, $B_1$, $R_2$, $B_2$) from the terminal 70 and also inputs the traffic data ($R_1$, $B_1$, $R_2$, $B_2$) declared by the terminal 70 which has already accepted the call accept request from the connected terminal traffic data storage unit 33. Then, the floating-point calculating portion 31A calculates (estimates) the cell loss ratio CLR on the assured side on the basis of the traffic data ($R_1$, $B_1$, $R_2$, $B_2$). Note that the calculation on the assured side implies the overestimation on the basis of the true cell loss ratio.

The RAM 31B stores the data used for the calculations by the floating-point calculating portion 31A, e.g., the traffic data, MDPP (Maximally Dense Packing Pattern) data, envelope calculation data and probability upper bound calculation data.

[Call Accept Determination Unit 32]

The call accept determination unit 32 compares the calculated value of the cell loss ratio CLR that is calculated by the cell loss ratio calculation unit 31 with the predetermined cell loss ratio fiducial value. The cell accept determination unit 32 determines whether or not the cell accept request issued from the traffic source is permitted on the basis of a result of this comparison.

<Principle, Theoretical Background of Cell Loss Rate Calculation>

Given above is the explanation of how the cell loss ratio calculation unit 31 calculates the cell loss ratio, and yet the principle, in another term, a theoretical background of the method of calculating the cell loss ratio will be described.

At first, the fact that the cell loss ratio CLR is evaluated on the assured side by the formula (1-1) is stated on pp. 982–989 of "Dynamic Call Admission Control in ATM Networks", written by H. Saito and K. Shiomoto, IEEE Journ. on Sel. Areas in Commun., Vol. 9, No. 7, September, 1992 (hereinafter termed a document (4)).

$$CLR \leq \sum_{k=0}^{\infty} [k-K]^+ p_1^* \ldots *p_n(k) / \sum_{k=0}^{\infty} p_1^* \ldots *p_n(k) \quad (1\text{-}1)$$

where N is the number of calls to be multiplexed, K is the buffer length, the symbol $[k-K]^+$ represents $k-K$ when $k \geq K$ but 0 when $k<K$, the symbol (*) indicates a convolution, T is the maximum delay value when the cell passes the buffer 20, and $p_1, \ldots, p_N$ indicates a probability distribution of the number of cells arriving within the time T from each traffic source in an equilibrated state.

The time T is given by the formula (1-2):

$$T = KL/C \quad (1\text{-}2)$$

where C [bit/s] is the output velocity of the unillustrated output-side highway, and L [bit] is the number of bits per cell.

In the formula (1-1), it can be interpreted that the numerator is an expected value when the number of cells arriving within the tim T exceeds K, while the denominator is an expected value of the number of cells arriving within the same time T. Accordingly, the formula (1-1) is equivalent to the formula (19):

$$CLR \leq E[[\zeta-K]^+]/E[\zeta] \quad (19)$$

where $\zeta$ is the probability variable indicating the number of cells arriving within the time T from the traffic source in which the N-calls are multiplexed.

Herein, in the following discussion, the formula (19) will be called "cell loss formula".

Next, a survivor function will be explained. The normal survivor function is defined by:

$$S_1(x) = \int_x^{\infty} f(t)dt$$

where f(x) is the probability density function relative to the probability variable x, and x takes only a non-negative value. For example, the number of cells in queue does not take a negative value in principle and therefore belongs to such a class. Further, f(x) may be a function including a delta function, and, therefore, a discrete case is included. Accordingly, the following discussion will be made without distinguishing whether f(x) is consecutive or discrete. In the documents (5), (6) and (9), the survivor function is used for defining the upper bound as a condition for characterizing an evaluation o the assured side.

For extending the survivor function in a high-order, a k-th order survivor function is recursively defined by:

$$Sk(x) = \int_x^\infty s_{k-1}(t)dt \quad (20)$$

Herein, when $S_0 \equiv f(x)$, there are established $S_1(0)=1$, $S_1(\infty)=1$ and $S'_1(\infty)=-f(x)$. The present inventors have proven that the next theorem 1 is generally established. Note that the proofs of all the theorems are omitted, but, as a matter of fact, the present inventors have already proven them.

(Theorem 1)

A moment $M_k$ is defined by:

$$M_k = \int_0^\infty x^k \cdot f(x)dx$$

Then, with respect to the k-th order survivor function, the following is established:

$S_k(0) = M_{k-1}/(k-1)!$ $S_k(\infty) = 0$ $S'_k(x) = -S_{k-1}(x)$

Further, when repeating a partial integration, the k-th order survivor function becomes:

(Theorem 2)

$$S_k(x) = \int_x^\infty \frac{(t-x)^{k-1}}{(k-1)!} f(t)dt$$

Especially, the following is obtained:

Further, if the k-th order survivor function of the probability density function f is written as $S_k(f)$, there $$S_2(K) = \int_K^\infty (x-K)f(x)dx \quad (21)$$

is obtained the following theorem 3 with respect to the convolution from an exchange of an integral sequence.

(Theorem 3)

With respect to an arbitrary probability density function h(t), the following is established:

$S_k(f*h) = S_k(f)*h = f*S_k(h)$

Note that a proof is made in an appendix to the document (4) when k=2 in this theorem.

First, the formula (19) will be examined. When considering an evaluation of the worst pattern, the denominator of the right side is given by a constant expressed such as:

$E[\zeta] = SCR \cdot K/V_{Link}$ (22)

On the other hand, it can be known that the numerator of the right side is obtained by use of the survivor function from the formula (21) as follows:

$E[[\zeta-K]^+] = S_2(K)$ (23)

where $S_2(x)$ is the second-order survivor function of $\zeta$.

Shown is a necessary and sufficient condition for the assured-side evaluation as a characteristic common to the survivor functions of the respective probability variables.

(Definition 1)

Let $F_k(x)$ and $G_k(x)$ be the k-th order survivor functions with respect to two probability density functions f(x) and g(x). Then, the following relationship is established:

$F_k(x) \leq G_k(x)$ for $\forall x$

In this case, f is referred to as a lower bound of a k-th order g (with respect to the survivor function), or alternatively g is referred to as an upper bound of a k-th order f (with respect to the survivor function). This is expressed such as:

$f \leq_k g$

From the definition of the survivor function, a theorem 4 is to be established.

(Theorem 4) (Simplicity Relative to Degree of Survivor Function)

$f \leq_k g \Rightarrow f \leq_l g$ for $\forall l \geq k$

The degree when each cell loss formula is expressed by the survivor function is termed a degree of the cell loss formula. For example, the degree of the formula (19) is 1.

When paying attention to the fact that the probability density function when multiplexed is given by the convolution, a theorem 5 is established from the theorem 3.

(Theorem 5) (Necessary and Sufficient Condition for Assured-Side Evaluation)

A necessary and sufficient condition under which a certain probability distribution f(x) gives an evaluation of the assured-side is to establish the following formula:

$f \geq_k g$ for $\forall g \in P$ where P is the probability distribution set obtained from all the passable patterns, and k is the degree of the cell loss formula.

This theorem includes a result relative to the assured-side evaluation shown in appendix B of the document (3) and generalized. Further, the result shown in the document (3) is a proof with respect to a certain special probability distribution but does not include a general probability distribution, especially, a result of a minimum upper bound which will be mentioned later.

The probability distribution set where the above property is established is termed a k-th upper bound of P and is expressed by $U_k(P)$, and, from the definition, the following is to be established:

$f \in U_k(P) \Leftrightarrow f \geq_k g$ for $\forall \in P$

The condition of the theorem 5 can be simply expressed such as:

$f \in U_k(P)$

In fact, in such an upper bound, the minimum, i.e., the following is obtained:

$f^* s.t. \ f^* \in U_k(P)$ and $f^* \leq_k f$ for $f \in U_k(P)$

From the definition and the theorem 3, the following theorem can be thereby easily demonstrated.

(Theorem 6)

$f^*(x)$ provides a maximum multiplexing efficiency under an assurance of being on the overestimated-side with respect to each cell loss formula.

$f^*$ given above is called a minimum upper bound with respect to the pattern set P.

From the discussion made so far, a relationship between the assurance on the overestimated side and the survivor function has been clarified, and hence a method of calculating the minimum upper bound will be explained in accordance with the definition. To start with, there may be obtained the minimum upper bound pertaining to the second-order survivor function with respect to $\zeta$ in the cell loss formula (formula (19)). When providing an arbitrary passage pattern with a period $T_{ob}$, a probability distribution $f(\zeta)$ of $\zeta$ therefor is calculated in the manner which follows.

Figure 23:
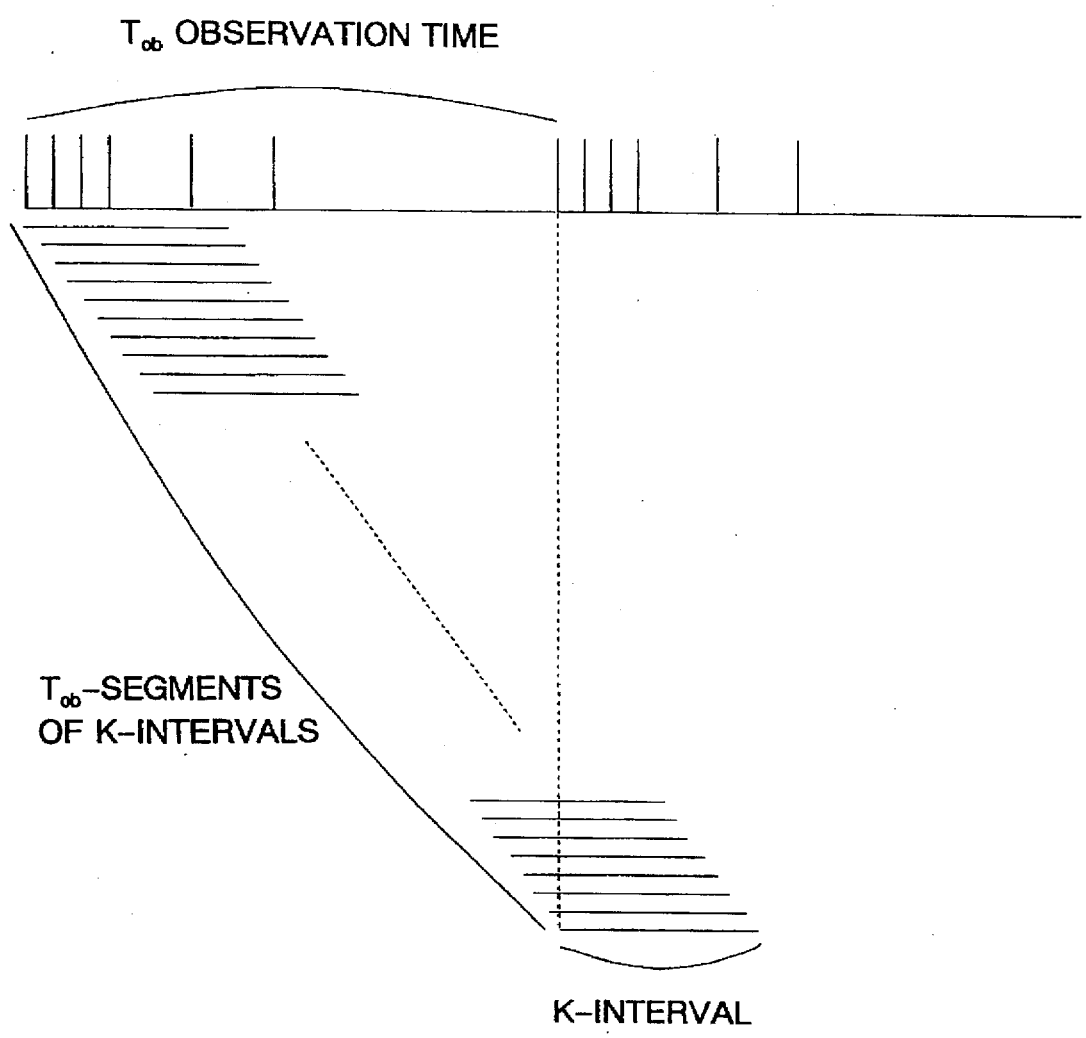
FIG. 23 is a conceptual diagram showing a method of obtaining a $\zeta$ probability distribution in a K-interval from the passage pattern in the second embodiment.

At first, as illustrated in FIG. 23, a pattern of $T_{ob}$ divided by the unit time is segmented by $T_{ob}$-segments of K-cell time windows overlapped with each other, the number of cells contained in each window is counted, and this is divided by a total number ($=T_{ob}$) of the windows, whereby a probability distribution of $\zeta$ with respect to the given pattern can be known. Such a K-cell time window is referred to as a K-interval. In the Figure, $T_{ob}$-pieces of K-intervals respectively deviate by the unit time, and there is shown such a situation that the first interval contains 5 cells, the second and third intervals contain 4 cells and the fourth interval contains 3 cells in sequence from above.

The fact that the $\zeta$ probability distribution can be known from a statistic of the number of cells contained in the individual intervals is based on the following reason. That is, when the traffic source having such a passage pattern is multiplexed with other traffic sources, and if it is presumed that the respective traffic sources are independent and random in terms of an initial phase, all such K-intervals are observed at an equal probability with respect to $\zeta$. Then, when the probability distribution $f(\zeta)$ is obtained, the high-order survivor function can be calculated more easily than that.

Since $\zeta$ takes only an integer value, if $f(\zeta)$ is expressed by use of an array $z[k]$ given by $z[k]=f(\zeta=k)$ ($k=0,\ldots,K$), the integral calculation shown in the formula (20) is a calculation of a partial sum of $z[k]$. More specifically, there are prepared an integral operation and a differential operation of the survivor function as shown by use of C languages in FIGS. 24 and 25. Thus, it can be understood that there can be effected conversions from a lower degree into a higher degree (integral operation) or from the higher degree into the lower degree (differential operation) of the survivor function respectively with an arithmetic quantity of $O(K)$.

Figure 26:
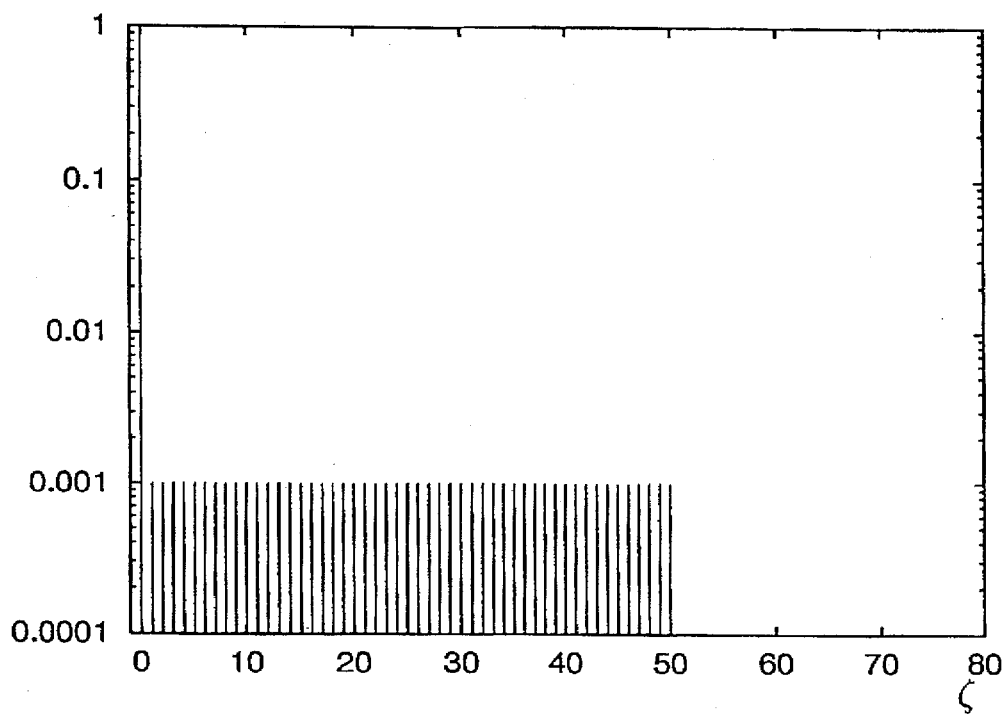
FIG. 26 is a diagram illustrating a $\zeta$ probability distribution relative to the passage pattern (1) (Ex. 1) in the second embodiment.
Figure 27:
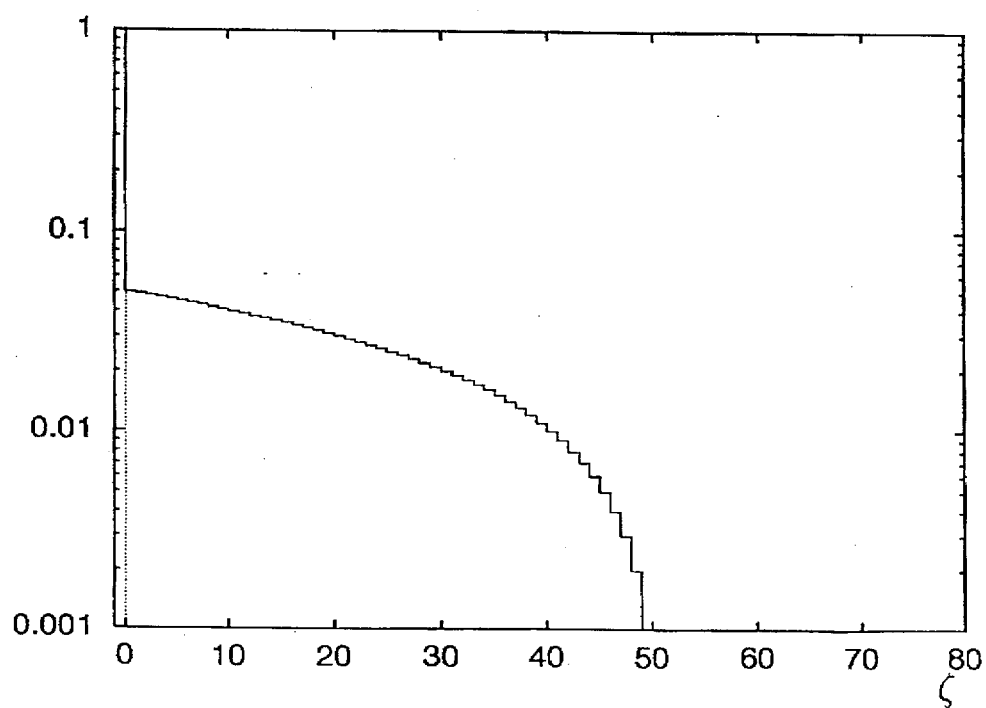
FIG. 27 is a diagram showing a $\zeta$ first-order survivor function relative to the passage pattern (1) (EX. 1) in the second embodiment.
Figure 28:
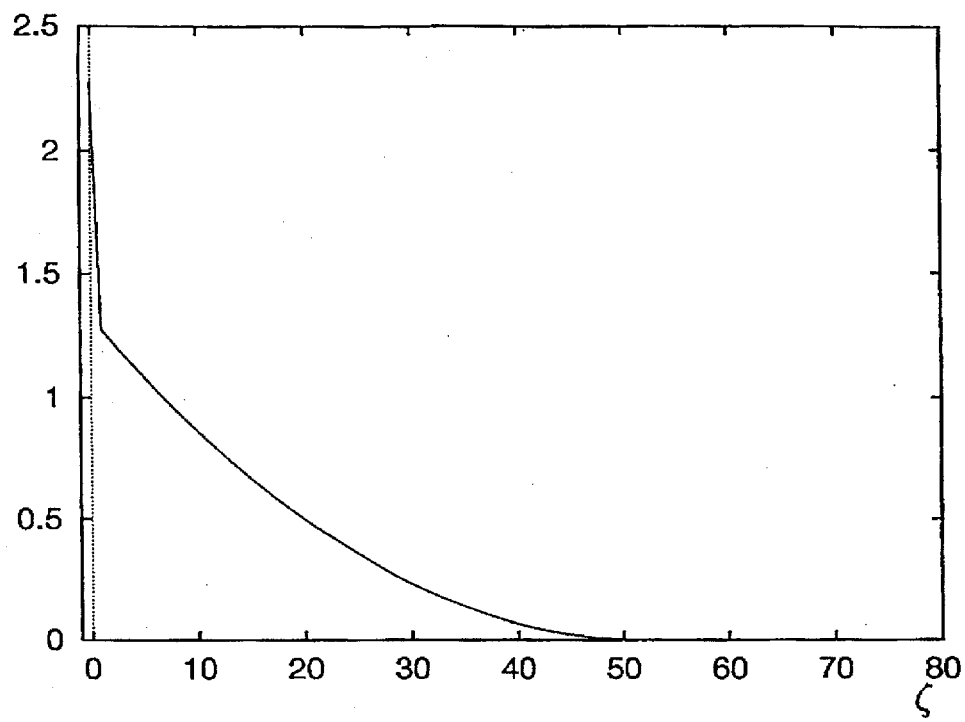
FIG. 28 is a diagram showing a $\zeta$ second-order survivor function relative to the passage pattern (1) (EX. 1) in the second embodiment.
Figure 29:
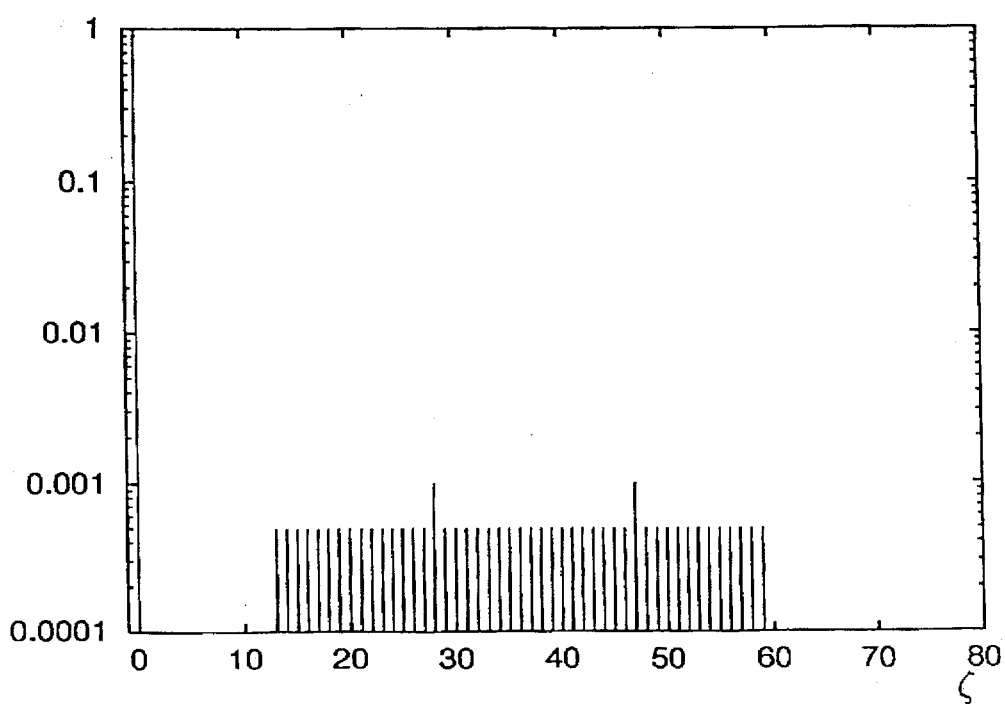
FIG. 29 is a diagram illustrating a $\zeta$ probability distribution relative to the passage pattern (2) (Ex. 2) in the second embodiment.
Figure 30:
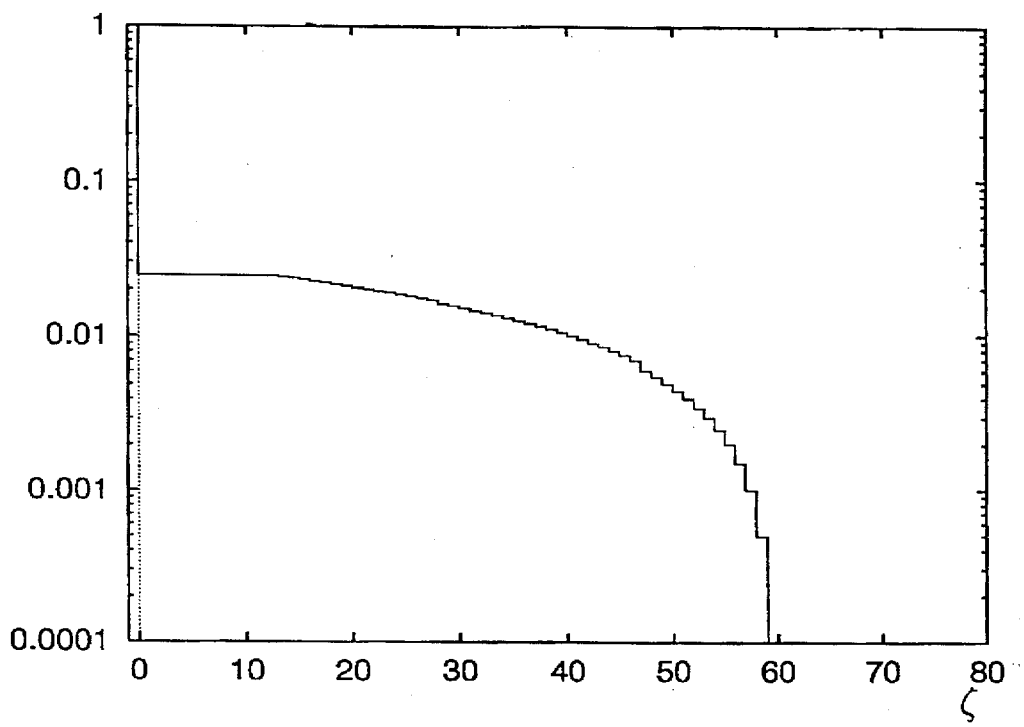
FIG. 30 is a diagram showing a $\zeta$ first-order survivor function relative to the passage pattern (2) (EX. 2) in the second embodiment.
Figure 31:
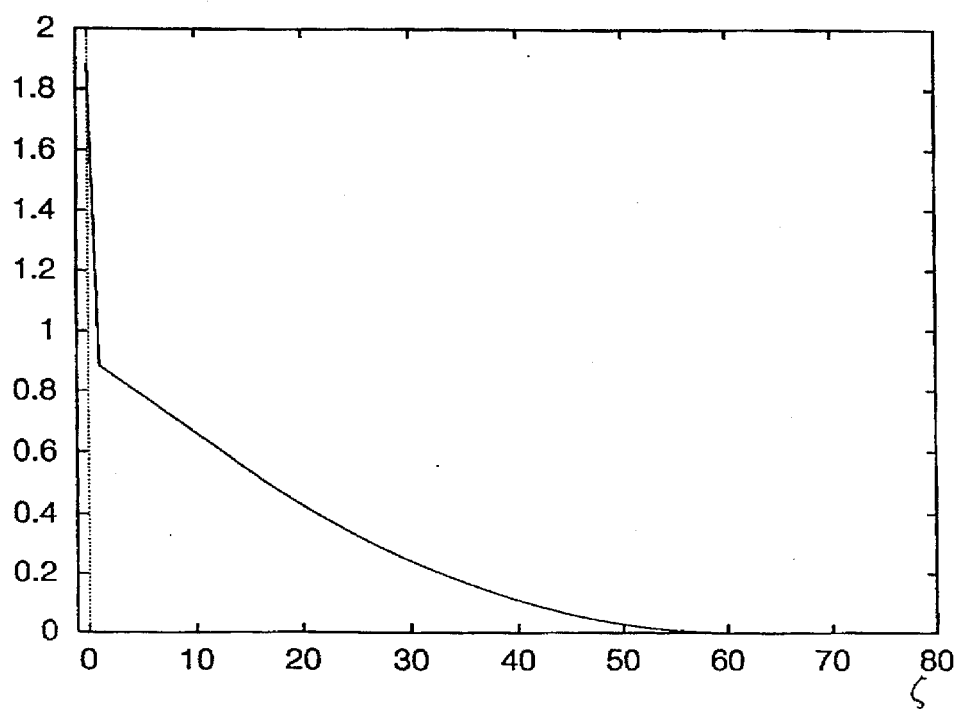
FIG. 31 is a diagram showing a $\zeta$ second-order survivor function relative to the passage pattern (1) ((EX. 1) in the second embodiment.
Figure 32:
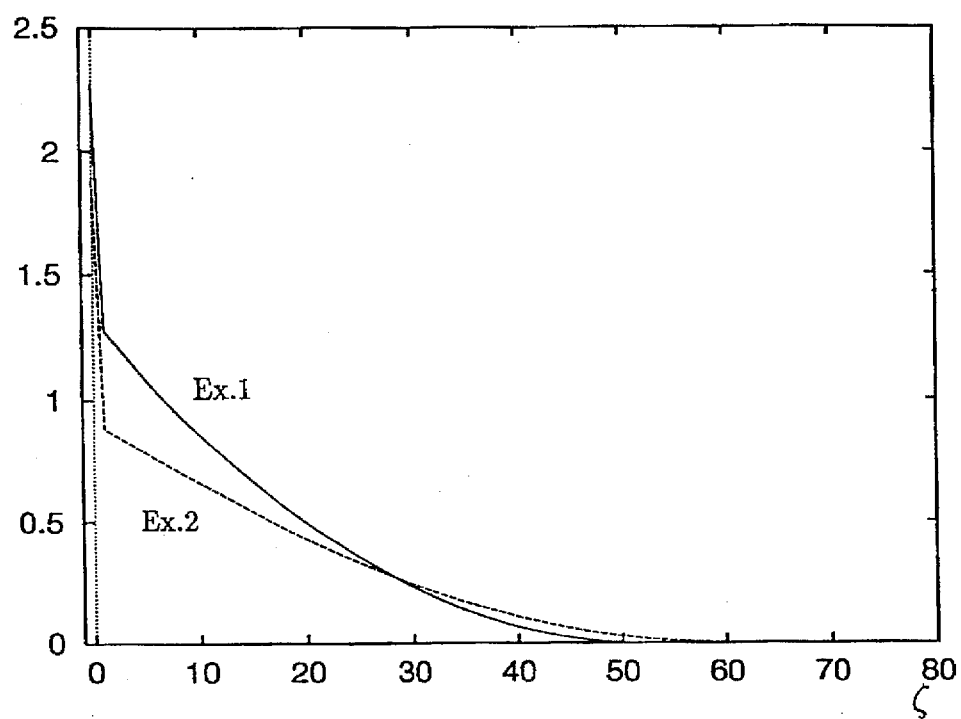
FIG. 32 is a diagram showing a comparison between the passage pattern (1) (EX. 1) and the passage pattern (2) (EX. 2) with respect to the second-order survivor function in the second embodiment.

FIGS. 26, 27 and 28 show respectively a $\zeta$ probability distribution with respect to a passage pattern (1) (hereinafter termed EX. 1) illustrated in FIG. 21 and first- and second-order survivor functions as well by way of examples. Further, FIGS. 29, 30 and 31 illustrate respectively a $\zeta$ probability distribution with respect to a passage pattern (2) (hereinafter termed EX. 2) shown in FIG. 22 and first- and second-order survivor functions as well. Herein, the buffer length K is set such as K=256. FIG. 32 is a diagram showing a comparison between the respective second-order survivor functions. As obvious from FIG. 32, two graphs intersect each other in the vicinity of $\zeta=30$, and, it can be known that both of them are not the worst pattern from the condition of the theorem 5.

As known from the above two examples, the worst pattern in a statistical sense is not generally given from a single deterministic pattern. The worst pattern in the statistical sense is, however, acquired by obtaining a set of patterns forming the upper bound with respect to the second-order survivor function and further calculating an envelope on the side of the upper bound of this set of patterns.

Figure 33:
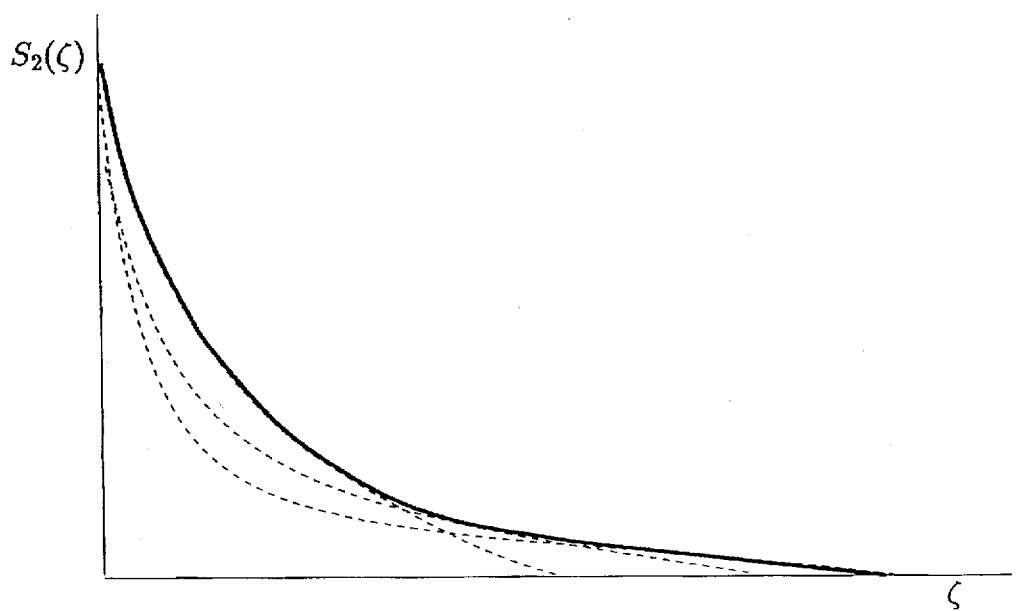
FIG. 33 is a conceptual diagram showing a calculation of a statistical worst pattern by an envelope of the second-order survivor function in the second embodiment.

Referring FIG. 33, a dotted line indicates the second-order survivor function obtained from individual pattern, while a solid line indicates the envelope obtained in the manner described above. This envelope turns out to be the statistical worst pattern.

More specifically, with respect to a set $\{S^{(k)}_2\}$ ($k=1,\ldots,K$) of the second-order survivor function that is obtained from the patterns forming the upper bound in connection with $S_2(\zeta)$ known as a maximally dense packing pattern, an upper bound $S_2(\zeta)$ of the second-order survivor function is obtained by performing the following calculation:

$$S^*_2(\zeta) = \max_K S^{(k)}_2(\zeta) \qquad (24)$$

The differential operation shown in FIG. 25 is performed twice thereon, thereby obtaining a probability distribution representing the worst pattern (the minimum upper bound in a sense of the theorem 6 at the same time) in the statistical sense.

(Maximally Dense Packing Pattern: MDPP)

The MDPP for calculating the upper bound of the second-order survivor function will be explained. The following assumption may be considered from the fact that the MDPP is periodic and also has to be a passage pattern of the corresponding leaky bucket.

(Assumption 1)

In a expression of an equivalent token model of the leaky bucket, a status of the token bucket at the beginning of the period is identical with a status thereof at the end of the period, and the respective buckets are in a full-of-token state.

More specifically, at the start of every period, each traffic source (and UPC device) is in an immediately-transmittable-status of the burst-like cells. A characteristic of the passage pattern can be expressed by a graph in which the attention is paid to the number of cells in the K-interval.

Figure 34:
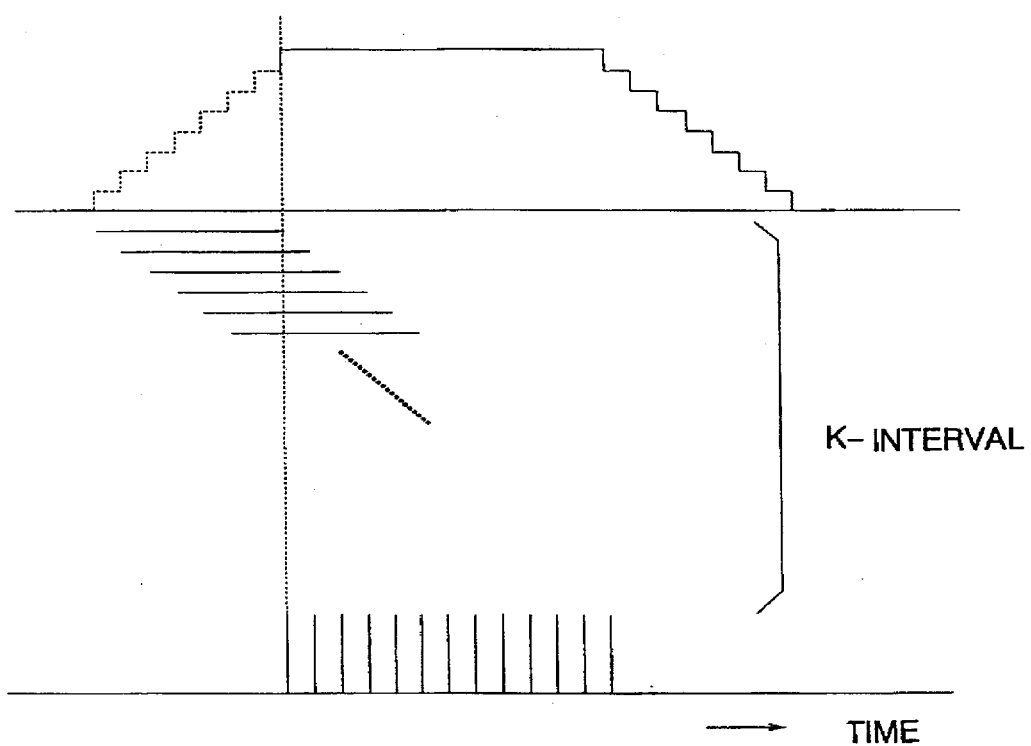
FIG. 34 is a diagram showing time-variations in a number-of-cells $C_K(t)$ in a K-interval in the second embodiment.

Obtained is, e.g., a graph as illustrated in FIG. 34, wherein the number of cells contained in the K-interval starting from the timing $t$ is given on the axis of ordinates, while the timing is given on the axis of abscissas with respect to each timing $t$ ($t=0,\ldots,T_{ob}-1$). Referring to FIG. 34, a cell arrival pattern is shown along the time-axis at a lower stage; the K-intervals overlapped in terms of time are shown in an intermediate stage; and variations in an intra K-interval number-of-cells $C_K(t)$ ($t=0,\ldots,T_{ob}-1$) at an upper stage. Incidentally, the assumption is that K=8 in FIG. 34.

Figure 35:
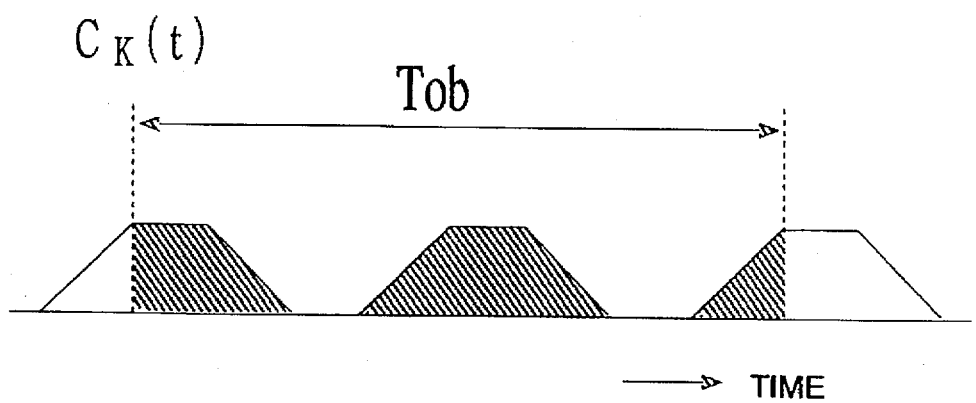
FIG. 35 is a diagram illustrating a relationship (part 1) between time-variations in $C_K(t)$ and an area in the second embodiment.

As illustrated in FIG. 35, $C_K(t)$ is a function which repeatedly increments and decrements stepwise, and this appears as a repetition of pattern as shown in FIG. 34 when seeing one period. Further, a height of the crest does not change over one cell at one time. It is also apparent from FIG. 35 that $C_K(t)$ corresponds to the cell passage pattern. When estimated on the assured side, the consideration may be given to only the pattern which actualizes the average SCR among the passable patterns, and hence the following theorems are established with respect to an area (shown by oblique lines in FIG. 35 under $C_K(t)$ contained in $T_{ob}$.

(Theorem 7)

The area under $C_K(t)$ is a constant SCR·K.

Note that the theorem is obvious from the fact that the single cell is counted in overlap for a duration of K-segments of K-intervals.

Figure 36:
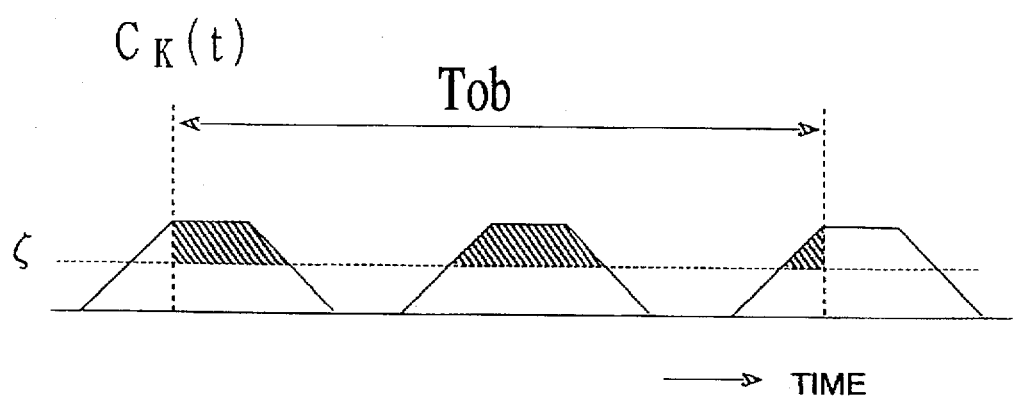
FIG. 36 is a diagram showing a relationship (part 2) between the time-variations in $C_K(t)$ and the area in the second embodiment.

Furthermore, in a relationship between the area of $C_K(t)$ and $S_2(\zeta)$, as shown by the oblique-line portions in FIG. 36, if it is assumed that $S(C_K(t) \geq \zeta)$ is the area of the portion where a value of $C_K(t)$ is $\zeta$ or larger, the following theorem 8 is established from the result of the theorem 7 and the way of obtaining $S_2(\zeta)$.

(Theorem 8)

$S(C_K(t) \geq \zeta)$ is equivalent to $S_2(\zeta)$ except for a difference between the constants. Namely:

$$S(C_K(t) \geq \zeta) = V_{Link} \cdot S_2(\zeta)$$

That is, it can be understood that the statistically worst pattern to maximize $S_2(\zeta)$ is the passage pattern to maximize the area inclusive of $\zeta$ but over $\zeta$ with respect to $C_K(t)$.

As discussed above, such a worst pattern is not expressed as a single deterministic pattern with respect to all the $\zeta$-values. This is, however, calculated from a repetition of such a crest-shaped pattern that a height of $C_K(t)$ comes to a certain fixed value h with a continuous burst as shown in FIG. 34.

When the continuous burst illustrated in FIG. 34 is expressed by the leaky bucket using the tokens, the parameters $(R_1, B_1)$ specify a cell interval $T_p$. Namely, there is no problem if the cell interval is $T_p$ or larger. There arises a problem in regard to a burst length when the parameters are $(R_2, B_2)$. That is, the number of consecutive cells at the peak cell rate or a rate less than the former is restricted by a size of a bucket $B_2$ and a velocity $R_2$ for inputting the token. A number-of-cells $N_b$ contained in the burst is given by:

$$N_b = |\zeta_o + \lambda_b - \zeta_E|$$

where $\zeta_o$ is the number of tokens in the bucket $B_2$ at the start of the burst, $\zeta_E$ is the number of tokens at the end of the burst, and $\lambda_b$ is the number of tokens arriving at the rate $R_2$ during a period from the start of the burst and to the end thereof. Herein, let $T_b$ be the duration time of the burst, and the number-of-tokens $\lambda_b$ is expressed such as $\lambda_b = R_2 \cdot T_b$, and hence, when values of $\zeta_o$ and $\zeta_E$ are kept the same, the number of transmittable cells increases in the continuous burst with the larger duration time $T_b$.

Under the preparation described above, first, the height h (maximum value of $C_K(t)$) of the burst is contemplated. Based on the same discussion as the theorem 7, let $N_b$ be the number of cells in the burst, and the area of the portion under $C_K(t)$ becomes $N_b \cdot K$.

Figure 37:
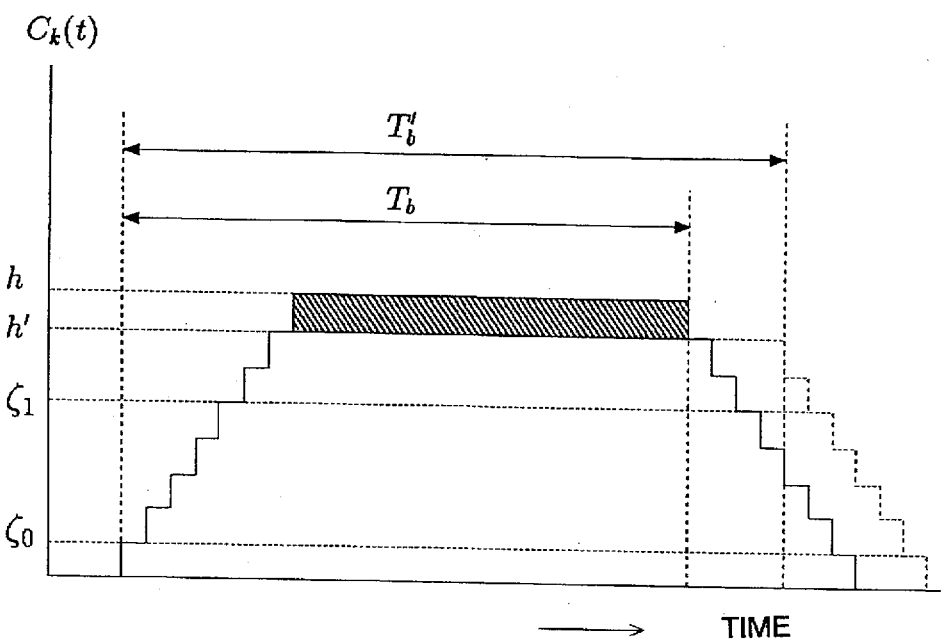
FIG. 37 is a conceptual diagram showing a condition (part 1) under which $S_2(\zeta)$ is maximized in the second embodiment.

As illustrated in FIG. 37, there is considered a case where the burst with the height h and the duration time $T_b$ is changed to have a height h' (h'<h) while keeping the number of tokens in the bucket.

The duration time thereby becomes $T'_b$ ($T'_b > T_b$), and it is assumed that the number of usable tokens increases due to the increment in the burst duration time. Generally, the number of usable tokens does not decrease even if the burst height is reduced. Further, even when the burst duration time increases, the passage pattern can be again obtained by causing the timing of the pattern subsequent to this burst to deviate by $T'_b - T_b$.

Herein, when examining $S_2(\zeta)$, it can be understood that $S_2(\zeta_o)$ decreases with a conversion of the burst height, but $S_2(\zeta_1)$ increases. That is, it can be known that there exists a certain height $h^*(\zeta)$ ($K/T_p \geq h^*(\zeta) \geq 0$) to maximize $S_2(\zeta)$ with respect to each value of $\zeta$.

Figure 38:
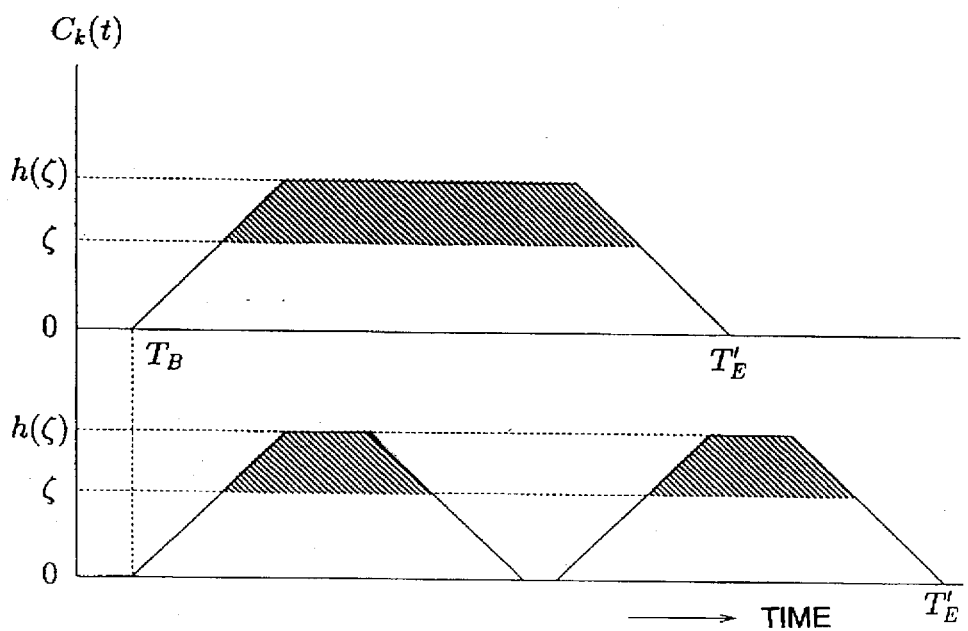
FIG. 38 is a conceptual diagram showing a condition (part 2) under which $S_2(\zeta)$ is maximized in the second embodiment.

Next, the duration time of the burst will be contemplated under a condition in which the burst height $h(\zeta)$ is fixed. As illustrated in FIG. 38, when making a comparison of $S_2(\zeta)$ (areas of oblique line portions) with respect to one continuous burst (upper stage) and two bursts (lower stage) under such a condition as to store the number of tokens, apparently $S_2(\zeta)$ of the upper stage has a larger area.

In general, in the crest-shaped graph representing the burst, a slope (portion drawn in white in FIG. 38) does not contribute to $S_2(\zeta)$, and, therefore, the burst continuing longer has a higher $S_2(\zeta)$ occupying rate to the entire area. Further, for reducing the area of the slope portion, it can be understood that the burst height $h(\zeta)$ is desirably increased as quickly as possible till this reaches a fixed value from $T_B$ in FIG. 38.

That is, if the cells are generated at the peak rate till the burst height reaches the fixed value $h(\zeta)$ after the start-of-burst time $(T_B)$, the $S_2(\zeta)$ rate is maximized. Eventually, when the burst having the maximum continuous length and the height $h(\zeta)$ is set as a basic pattern (B.P.) having a level $h(\zeta)$ under the bucket condition $(R_2, B_2)$, the basic pattern B.P. is generated by an algorithm which follows.

(Algorithm (1))

[Method of Generating Basic Pattern (B.P.) with Height $h(\zeta)$]

Step 1: It is assumed that the bucket is full of tokens ($= B_2$) at the start-of-burst time $(T_B)$.

Step 2: The cells are generated at the peak rate till the burst height reaches $h(\zeta)$ but generated at such a velocity as to keep $h(\zeta)$ after the burst height has reached $h(\zeta)$. That is, the generation of the cells continues with such a pattern that $h(\zeta)$-pieces of cells are contained just in one K-interval.

Step 3: The generation of the cells stops immediately when emptying the tokens from the bucket $(B_2)$ and ceases till the bucket is again full of tokens.

Where the pattern obtained by such a B.P. repetition is referred to as the maximally dense pattern (MDPP) of the level $h(\zeta)$, the MDPP is generated by a following algorithm 2 using the above algorithm 1.

(Algorithm (2))

[Method of Generating MDPP with Height $h(\zeta)$]

Step 1: It is assumed that the bucket is full of tokens ($= B_2$) at the start-of-burst time $(T_B)$.

Step 2: For a duration of establishment of the following conditions (A) and (B), the basic. pattern B.P. with the height $h(\zeta)$ is continuously generated by use of the algorithm 1.

(A); The number of cells generated since the burst was started does not exceed a product of the observation time and the average rate, i.e., $T_{ob} \cdot R_2$.

(B); The number of tokens in the bucket after the time $T_{ob}$ has elapsed since the start of the burst can be kept to $B_2$.

The condition (A) in the above algorithm (2) is a restriction given by the average rate $(R_2)$. The condition (B) is drawn from the fact that the pattern is a $T_{ob}$ periodic pattern. Particularly, the condition (B) implies that the number of tokens in the bucket is required to be restored up to the original number before a new period starts after the time $T_{ob}$ has elapsed. From the discussion made so far, the following theorem 9 is established with respect to the MDPP.

(Theorem 9)

$S_2(\zeta)$ is maximized by the MDPP of the level $h(\zeta)$.

In the actual calculation, there is no necessity for obtaining $h(\zeta)$ with respect to each value of $\zeta$. When $h(\zeta)$ is an integer value in a range of $K \geq h(\zeta) \geq 0$, and when $K > MSB \cdot T_p$ (where $T_p, T_s$ are the cell arrival intervals at the peak and average rates) with respect to K defined as its upper limit is established, an expectable maximum value $h_{max}$ of h is given by:

$$h_{max} = MBS + (K-MBS)/T_s \geq h(\zeta) \geq 0$$

this formula is established, and hence $S_2(\zeta)$ is individually calculated with respect to such an MDPP of each level 1 that $h_{max} \geq 1 \geq 0$. Then, the above-described envelope calculation is effected with respect to each value of $\zeta$, thereby making it possible to obtain an upper bound $S^*_2(\zeta)$ of the second-order survivor function to be obtained.

The MDPP of each level is regular and takes the same repetitive pattern. For this reason, as a matter of fact, there is no necessity for generating the corresponding B.P. and MDPP in the form of the cell arrival patterns by use of the algorithms 1 and 2, and it is possible to immediately obtain only the second-order survivor function $S_2(\zeta)$ by a simple numerical calculation. Therefore, an intricacy for calculating $S^*_2(\zeta)$ does not exceed $O(K)$. Further, a memory capacity needed for this calculation is an array having a size corresponding to K at the maximum, and there is absolutely no necessity for preparing a special table. It is also obvious that the upper bound calculated in this way turns out a minimum upper bound in the sense of the theorem 6.

When $S^*_2(\zeta)$ is obtained by the above procedures, the probability distribution $f^*(\zeta)$ of the statistically worst pattern $\zeta$ can be obtained by performing the differential operation twice. If this applied to the accept control, the minimum upper bound $f^*_i(\zeta)$ (i=1, ..., N) of each traffic source is calculated from the leaky bucket parameters of the UPC for controlling every traffic source as a target for multiplexing.

In the case of calculating the upper bound of the cell loss ratio in accordance with the cell loss formula (formula (19)), since each traffic source is independent, the probability distribution is expressed by convolution such as:

$$\Phi(\zeta) = f^*_1 * \ldots * f^*_N(\zeta) \quad (26)$$

With respect to the probability distribution, the formula (19) is calculated, whereby the upper bound of the cell loss ratio can be calculated. Herein, the denominator of the formula (19) is expressed by:

$$E[\zeta] = \left( \sum_{i=1}^{N} SCR_i \right) \cdot K/V_{link}$$

where $SCR_i$ (i=1, ..., N) is the average rates of the respective traffic sources. In particular, the evaluation in the formula (26) can be accurately calculated at a high speed by use of the large deviation theory explained on pp. 183-193 in the document (8). Further, the probability variable $\zeta$ is a discrete variable taking only the integer value and can be therefore dealt with as a lattice variable, whereby a more accurate result can be obtained.

<Method of Calculating Cell Loss ratio in Second Embodiment>

Figure 39:
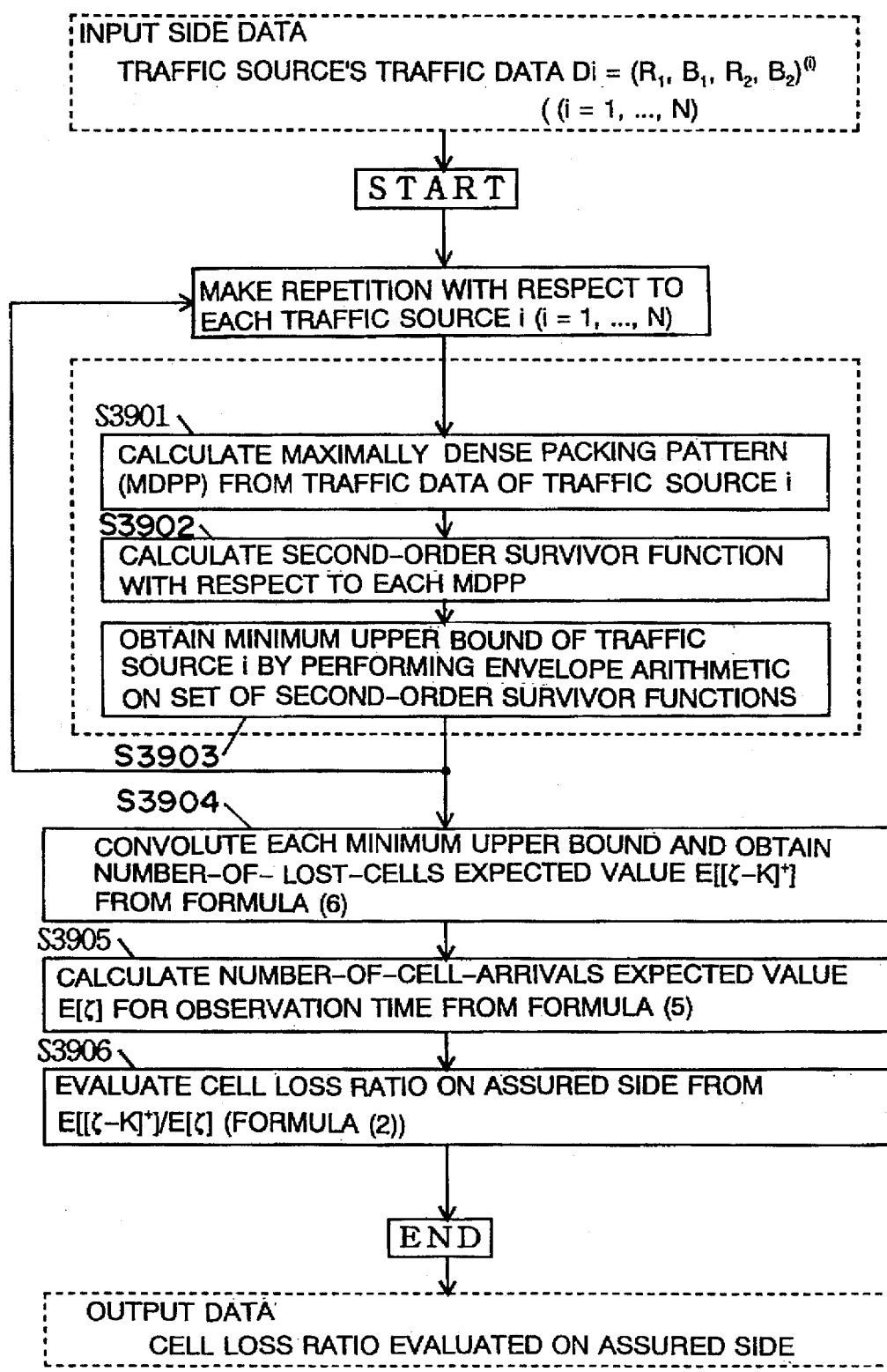
FIG. 39 is a processing flowchart for calculating the cell loss ratio in the second embodiment.

FIG. 39 is a processing flow for calculating the cell loss ratio in the second embodiment. As illustrated in FIG. 39, a series of processing flow consists of processing steps 3901–3906. Hereinafter, each processing step will be described.

(Processing Step 3901)

Figure 40:
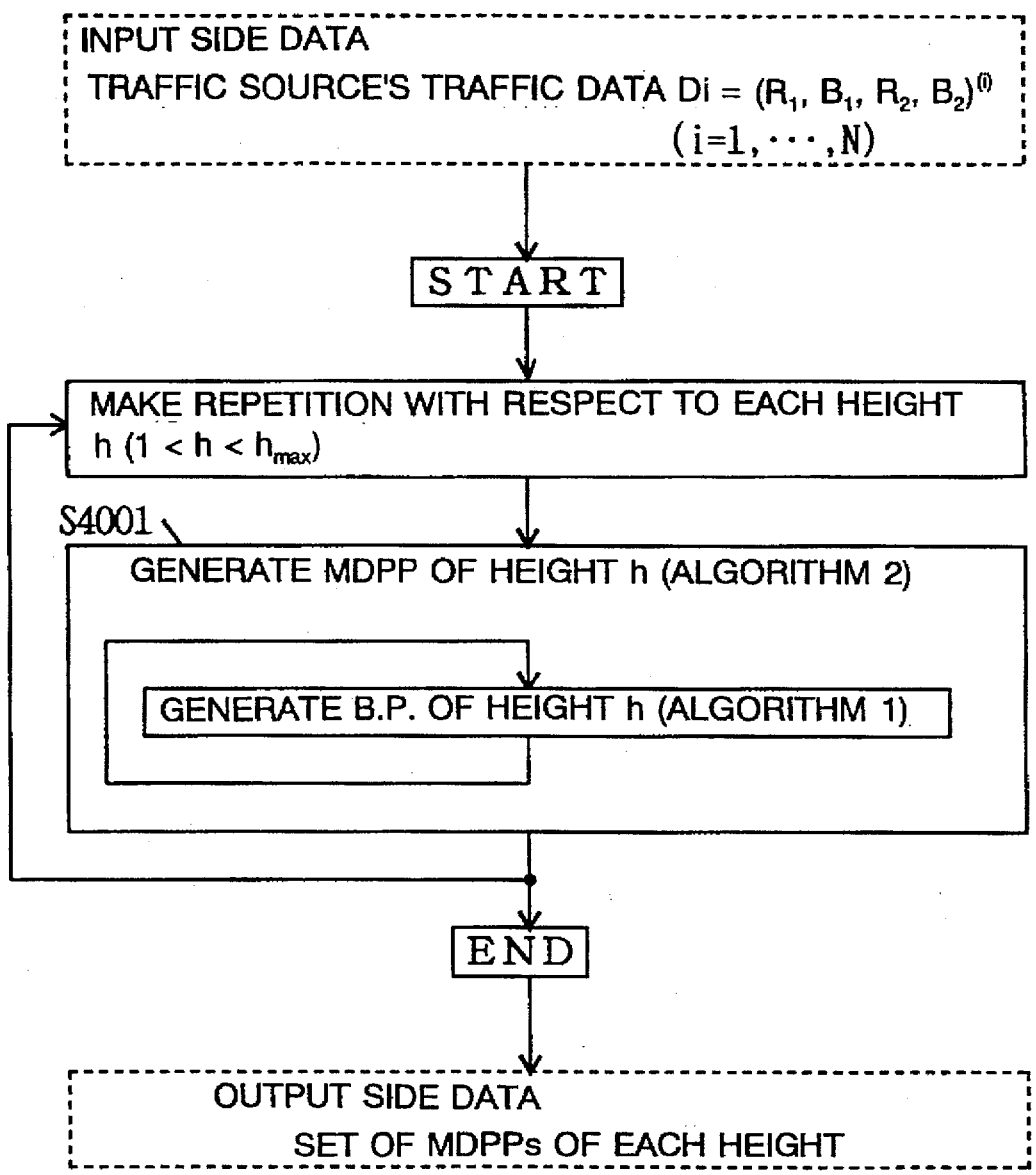
FIG. 40 is a detailed processing flowchart of processing step 3901 of FIG. 39.

Processing step 3901 is a step of calculating a set of maximally dense packing pattern s (MDPP) of the respective levels from the traffic data of the traffic sources i (i=1, ..., N). Specifically, this is actualized in processing step 4001 shown in FIG. 40.

First, in processing step 4001, The MDPPs having the height h are sequentially generated in sequence from 1 up to $h_{max}$ ($h_{max}$ is given by the formula (25)) with respect to h by use of the algorithm 2. At this time, the basic pattern (B.P.) with the height h is generated by employing the algorithm 1.

Note that the number-of-cell-arrivals distribution is directly obtained based on the regularity of the MDPP, or rather the second-order survivor function can be directly calculated by the integral operation, and hence this processing step 4001 may not be actually performed.

(Processing Step 3902)

Figure 41:
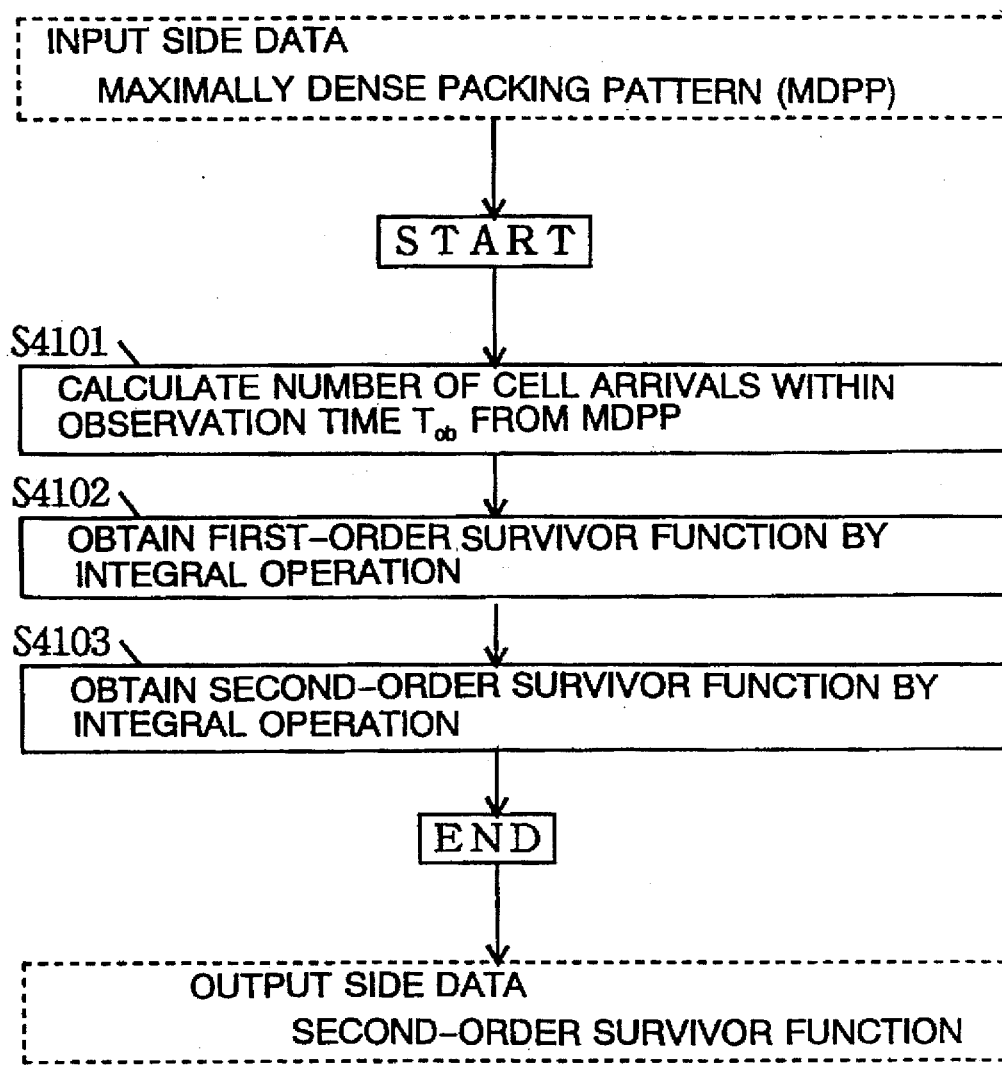
FIG. 41 is a detailed processing flowchart of processing step 3902 of FIG. 39.

Processing step 3902 is a step of calculating the second-order survivor function with respect to each MDPP by performing the integral operation twice from the number-of-cell-arrivals distribution. Specifically, this is actualized in processing steps 4101–4103 shown in FIG. 41.

At first, in processing step 4101, the number of cells arriving within the observation time $T_{ob}$ from the MDPP is calculated.

Next, in processing step 4102, the first-order survivor function is obtained by the integral operation.

Subsequently, in processing step 4103, the second-order survivor function is obtained by the integral operation.

(Processing Step 3903)

Figure 42:
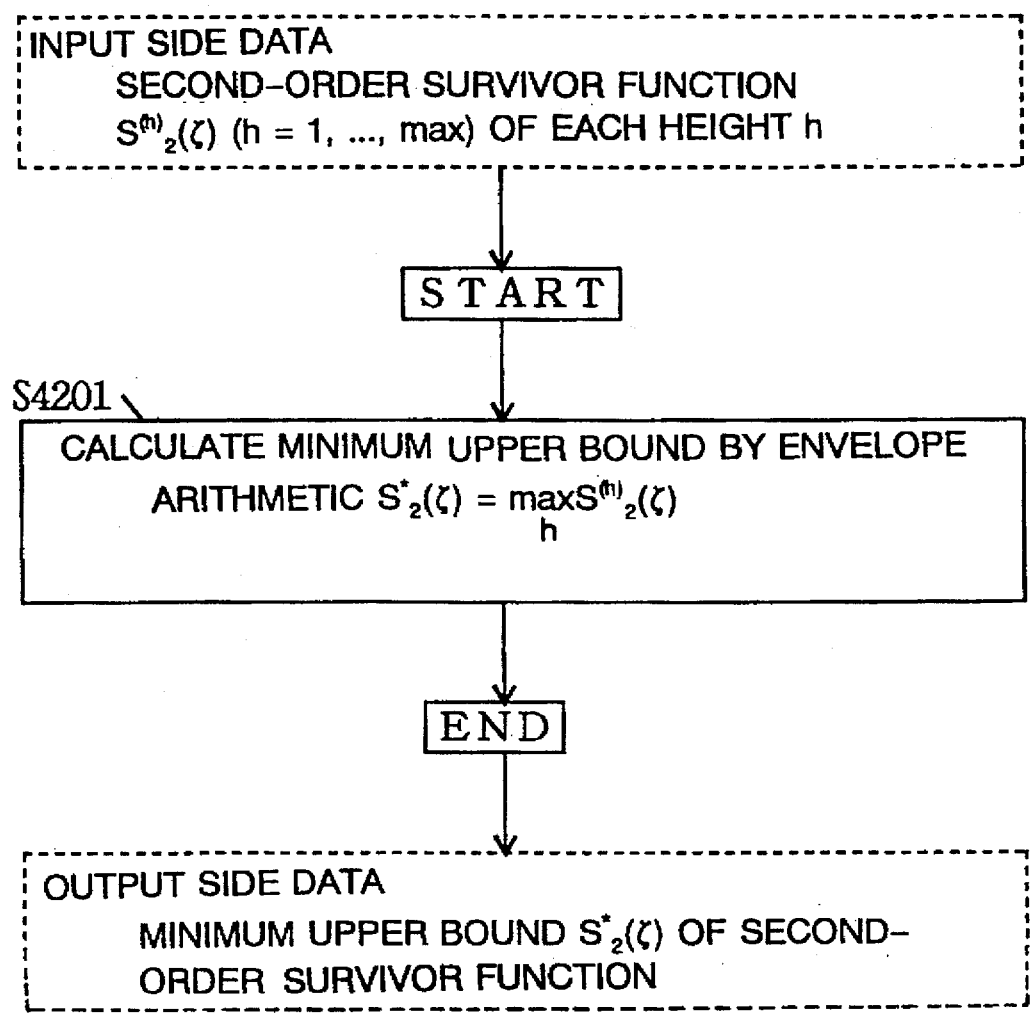
FIG. 42 is a detailed processing flowchart of processing step 3903 of FIG. 39.

Processing step 3903 is a step of obtaining the minimum upper bound of the traffic source i by effecting the envelope arithmetic with respect to the set of second-order survivor functions. Specifically, this is actualized in processing step 4201 shown in FIG. 42.

To start with, in processing step 4201, the envelop arithmetic is carried out. This envelop arithmetic does not entail the second-order survivor functions $S^{(h)}_2(\zeta)$ with respect to all the heights h at one time, but the maximum values are sequentially obtained in sequence from 1 up to $h_{max}$ with respect to h, thereby obtaining the minimum upper bound $S^*_2(\zeta)$.

(Processing Step 3904)

Figure 43:
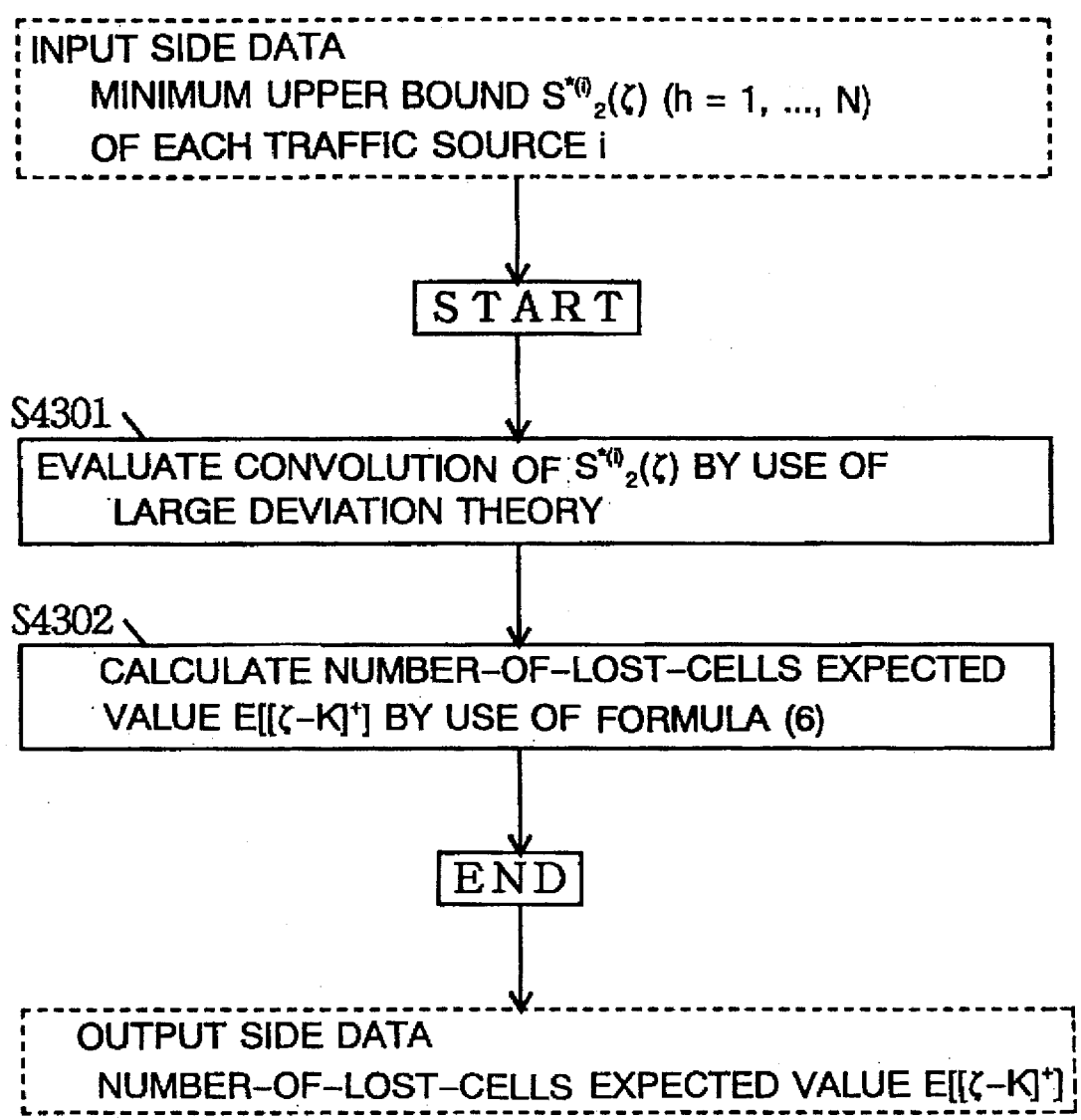
FIG. 43 is a detailed processing flowchart of processing step 3904 of FIG. 39.

Processing step 3904 is a step of performing a convoluting calculation. Specifically, this is actualized in processing steps 4301–4302 shown in FIG. 43.

First, in processing step 4301, the large deviation theory is applied to the minimum upper bound $S^{*(i)}_2(\zeta)$ of each traffic source i, thus evaluating a result of the convolution on the assured side.

Next, in processing step 4302, a number-of-lost-cells expected value $E[[\zeta-K]^+]$ by use of the formula (23).

(Processing Step 3905)

Processing step 3905 is a step of calculating an expected value $E[\zeta]$ of the number of cells arriving within the observation time $T_{ob}$ by use of the formula (22).

(Processing Step 3906)

In processing step 3906, the cell loss ratio is evaluated on the assured side by the formula (19), i.e., $E[[\zeta-K]^{3o}]/E[\zeta]$.

It is apparent that, in this invention, a wide range of different working modes can be formed based on the invention without deviating from the spirit and scope of the invention. This invention is not restricted by its specific working modes except being limited by the appended claims.

What is claimed is:

1. A call accept controller comprising:

a cell loss ratio calculation unit for calculating a cell loss ratio of a buffer for storing call cell from a plurality of traffic sources by a method comprising a distribution expressing step of expressing a distribution of the number of cells accumulated within a time for which the cell passes said buffer by use of a Poisson distribution on an assured side; a number-of-average-arrivals expressing step of expressing the number-of-cells distribution with parameters representing a number of average arrivals of the Poisson distribution; an average path calculating step of calculating an average path with respect to time-variations of a cell arrival ratio and a distribution of the cell arrival ratio; and a cell loss ratio calculating step of calculating the cell loss ratio of said average path calculating step as well as by using a table for storing a precalculated value of a number-of-lost-cells expected value corresponding to each number of average arrivals; and a call accept determination unit for comparing a cell loss ratio calculated value calculated by said cell loss ratio calculation unit with a predetermined cell loss ratio fiducial value and determining whether or not a call accept request from each of the traffic sources is permitted on a result of this comparison.

2. A call accept controller comprising:

a cell loss ratio calculation unit for calculating a cell loss ratio of a buffer for storing call cell from a plurality of traffic sources by a method comprising a second-order survivor function calculating step of calculating, for every traffic source, a second-order survivor function relative to a maximally dense packing pattern obtained based on traffic data inputted from the traffic source; a minimum upper bound calculating step of calculating a minimum upper bound for every traffic source by performing an envelope arithmetic on a set of second-order survivor functions calculated in said second-order survivor function calculating step; a number-of-lost-cells expected value calculating step of calculating a number-of-lost-cells expected value by convoluting the minimum upper bound for every traffic source that is calculated in said minimum bound calculating step; a number-of-cell-arrivals expected value calculating step of calculating a number-of-cell-arrivals expected value for a predetermined observation time; and a cell loss ratio assured-side calculating step of calculating a cell loss ratio of said buffer on an assured side on the basis of the number-of-lost-cells expected value calculated in said number-of-lost-cells expected value calculating step and the number-of-cell-arrivals expected value calculating step; and a call accept determination unit for comparing a cell loss ratio calculated value calculated by said cell loss ratio calculation unit with a predetermined cell loss ratio fiducial value and determining whether or not a call accept request from each of the traffic sources is permitted on a result of this comparison.

3. A call accept controller according to claim 2, wherein said second-order survivor function calculating step includes:

a-number-of-cell-arrivals calculating step of calculating a number of cell arrivals within the predetermined observation time on the basis of the maximally dense packing pattern;

a first-order survivor function acquiring step for acquiring a first-order survivor function by integrally calculating a number of cell arrivals that is calculated in said number-of-cell-arrivals calculating step; and a second-order survivor function acquiring step of acquiring a second-order survivor function by integrally calculating the first-order survivor function acquired in said first-order survivor function acquiring step.

4. A call accept controller according to claim 2, wherein the envelop arithmetic effected in said minimum upper bound calculating step is an arithmetic of selecting a maximum value among the values of the respective survivor functions.

5. A call accept controller according to claim 2, wherein each of the minimum upper bounds is convoluted based on a large deviation theory and evaluated on the assured side in said number-of-lost-cells expected value calculating step.

6. A call accept controller comprising:

a cell loss ratio calculation unit for calculating a cell loss ratio of a buffer for storing call cell from a plurality of traffic sources by a method comprising an interval segmentation step for segmenting a cell arrival ratio into a plurality of intervals in accordance with a value thereof on the basis of traffic data inputted from said traffic sources; an assured-side path calculating step of calculating an assured-side path-of each traffic type to be multiplexed for each of the intervals obtained by the segmentation in said interval segmentation step on the basis of the traffic data inputted from said traffic sources and the intervals obtained by the segmentation in said interval segmentation step; a number-of-average-arrivals parameter calculating step of calculating a number-of-average-arrivals parameter of the assured-side path calculated in said assured-side path calculating step for every interval obtained by the segmentation in said interval segmentation step; a number-of-lost-cells expected value calculating step of calculating an expected value of the number of lost cells for every assured-side path for every interval obtained by the segmentation in said interval segmentation step on the basis of at least the number-of-average-arrivals parameter calculated in said number-of-average-arrivals parameter calculating step; a cell arrival ratio distribution upper bound calculating step of calculating an upper bound of the cell arrival ratio distribution for every interval obtained by the segmentation in said interval segmentation step; an according-to-interval number-of-lost-cells calculating step of calculating a number-of-lost-cells expected value as a contribution from the relevant interval according to every interval obtained by the segmentation in said interval segmentation step on the basis of the number-of-lost-cells expected value according to every interval that is calculated in said number-of-lost-cells expected value calculating step and the upper bound of the cell arrival ratio distribution calculated in said cell arrival ratio distribution upper bound calculating step; a number-of-lost-cells expected value calculating step of calculating a number-of-lost-cells expected value by adding the number-of-lost-cells expected value according to every interval that is calculated in said according-to-interval number-of-lost-cells calculating step; a number-of-average-arrival-cells calculating step of calculating the number of average arrival cells for a predetermined observation time of each of said traffic sources; and a cell loss ratio assured-side calculating step of calculating a cell loss ratio of said buffer on the assured side on the basis of the number-of-lost-cells expected value calculated in said number-of-lost-cells expected value calculating step and the number of average arrival cells that is calculated in said number-of-average-arrival-cells calculating step; and a call accept determination unit for comparing a cell loss ratio calculated value calculated by said cell loss ratio calculation unit with a predetermined cell loss ratio fiducial value and determining whether or not a call accept request from each of the traffic sources is permitted on a result of this comparison.

7. A call accept controller according to claim 6, wherein said interval segmentation step includes:

an average dispersion calculating step of calculating an average $\mu$ and a dispersion $\sigma$ of the cell arrival ratio distribution;

a deviation value calculating step of calculating a deviation value K corresponding to a calculation accuracy;

a number-of-intervals calculating step of calculating a number-of-intervals L which corresponds to an interval accuracy; and an equally segmenting step of equally segmenting an interval from $\mu-K\sigma$ to $\nu+K\sigma$ into L-segments of intervals.

8. A call accept controller according to claim 6, wherein the traffic data inputted from each of said traffic sources are an item of data for specifying a peak rate and an item of data for specifying an average rate.

9. A call accept controller according to claim 6, wherein said assured-side path calculating step includes:

a time constant/cell arrival ratio calculating step of calculating a time constant and a cell arrival ratio in the relevant interval according to every traffic type;

an individual assured-side path calculating step of individually calculating the assured-side path with respect to every traffic type; and an assured-side path synthesizing step of synthesizing the individual assured-side paths calculated in said individual assured-side path calculating step.

10. A call accept controller according to claim 6, wherein said number-of-average-arrival parameter calculating step is to calculate an area under the assured-side path calculating in said assured-side path calculating step as a number-of-average-arrivals parameter.

11. A call accept controller according to claim 6, wherein said number-of-lost-cells expected value calculating step includes:

an index calculating step of calculating an index on the basis of the number-of-average-arrivals parameters and the unit of a table by making use of the table in which the indices are previously made corresponding to the number-of-lost-cells expected values; and a number-of-lost-cells expected value reading step of reading the number-of-lost-cells expected value of the table which corresponds to the index calculated in said index calculating step.

12. A call accept controller according to claim 6, wherein said according-to-interval number-of-lost-cells calculating step includes:

an inter two-points upper bound value calculating step of calculating a value obtained by subtracting an upper bound value of the cell arrival ratio distribution at the lower edge of each interval from the upper bound value of the cell arrival ratio distribution at the upper edge of each interval; and an according-to-interval number-of-lost-cells expected value calculating step of calculating a value obtained by multiplying the value calculated in said inter two-points upper bound value calculating step by the number-of-lost-cells expected value in the form of a number-of-lost-cells expected value as a contribution from the relevant interval.

13. A method of controlling a call accept comprising:
(a) a cell loss ratio calculation step of calculating a cell loss ratio of a buffer for storing call cell from a plurality of traffic source by a method comprising:
a distribution expressing step of expressing a distribution of the number of cells accumulated within a time for which the cell passes said buffer by use of a Poisson distribution on an assured side;
a number-of-average-arrivals expressing step of expressing the number-of-cells distribution with parameters representing a number of average arrivals of the Poisson distribution;
an average path calculating step of calculating an average path with respect to time-variations of a cell arrival ratio and a distribution of the cell arrival ratio; and
a cell loss ratio calculating step of calculating the cell loss ratio of said buffer by using a result of the calculation in said average path calculating step as well as by using a table for storing a precalculated value of a number-of-lost-cells expected value corresponding to each number of average arrivals; and
(b) a call accept determination step of comparing a cell loss ratio calculated by said cell loss ratio calculation step with a predetermined cell loss ratio fiducial value and determining whether or not a call accept request from each of the traffic sources is permitted on a result of this comparison.

14. A method of controlling a call accept comprising:
(a) a cell loss ratio calculation step of calculating a cell loss ratio of a buffer for storing call cell from a plurality of traffic source by a method comprising:
an interval segmentation step for segmenting a cell arrival ratio into a plurality of intervals in accordance with a value thereof on the basis of traffic data inputted from said traffic sources;
an assured-side path calculating step of calculating an assured-side path of each traffic type to be multiplexed for each of the intervals obtained by the segmentation in said interval segmentation step on the basis of the traffic data inputted from said traffic sources and the intervals obtained by the segmentation in said interval segmentation step;
a number-of-average-arrivals parameter calculating step of calculating a number-of-average-arrivals parameter of the assured-side path calculated in said assured-side path calculating step for every interval obtained by the segmentation in said interval segmentation step;
a number-of-lost-cells expected value calculating step of calculating an expected value of the number of lost cells for every assured-side path for every interval obtained by the segmentation in said interval segmentation step on the basis of at least the number-of-average-arrivals parameter calculated in said number-of-average-arrivals parameter calculating step;
a cell arrival ratio distribution upper bound calculating step of calculating an upper bound of the cell arrival ratio distribution for every interval obtained by the segmentation in said interval segmentation step;
an according-to-interval number-of-lost-cells calculating step of calculating a number-of-lost-cells expected value as a contribution from the relevant interval according to every interval obtained by the segmentation in said interval segmentation step on the basis of the number-of-lost-cells expected value according to every interval that is calculated in said number-of-lost-cells expected value calculating step and the upper bound of the cell arrival ratio distribution calculated in said cell arrival ratio distribution upper bound calculating step;
a number-of-lost-cells expected value calculating step of calculating a number-of-lost-cells expected value by adding the number-of-lost-cells expected value according to every interval that is calculated in said according-to-interval number-of-lost-cells calculating step;
a number-of-average-arrivals-cells calculating step of calculating the number of average arrival cells for a predetermined observation time of each of said traffic sources; and
a cell loss ratio assured-side calculating step of calculating a cell loss ratio of said buffer on the assured side on the basis of the number-of-lost-cells expected value calculated in said number-of-lost-cells expected value calculating step and the number of average arrival cells that is calculated in said number-of-average-arrival-cells calculating step; and
(b) a call accept determination step of comparing a cell loss ratio calculated by said cell loss ratio calculation step with a predetermined cell loss ratio fiducial value and determining whether or not a call accept request from each of the traffic sources is permitted on a result of this comparison.

15. A method of controlling a call accept according to claim 14, wherein the traffic data inputted from each of said traffic sources are an item of data for specifying a peak rate and an item of data for specifying an average rate.

16. A method of controlling a. call accept according to claim 14, wherein said interval segmentation step includes:

an average dispersion calculating step of calculating an average $\mu$ and a dispersion $\sigma$ of the cell arrival ratio distribution;

a deviation value calculating step of calculating a deviation value K corresponding to a calculation accuracy;

a number-of-intervals calculating step of calculating a number-of-intervals L which corresponds to an interval accuracy; and an equally segmenting step of equally segmenting an interval from $\mu-K\sigma$ to $\mu+K\sigma$ into L-segments of intervals.

17. A method of controlling a call accept according to claim 14, wherein said assured-side path calculating step includes:

a time constant/cell arrival ratio calculating step of calculating a time constant and a cell arrival ratio in the relevant interval according to every traffic type;

an individual assured-side path calculating step of individually calculating the assured-side path with respect to every traffic type; and an assured-side path synthesizing step of synthesizing the individual assured-side paths calculated in said individual assured-side path calculating step.

18. A method of controlling a call accept according to claim 14, wherein said number-of-average-arrival parameter calculating step is to calculate an area under the assured-side path calculating in said assured-side path calculating step as a number-of-average-arrivals parameter.

19. A method of controlling a call accept according to claim 14, wherein said number-of-lost-cells expected value calculating step includes:

an index calculating step of calculating an index on the basis of the number-of-average-arrivals parameters and the unit of a table by making use of the table in which the indices are previously made corresponding to the number-of-lost-cells expected values; and a number-of-lost-cells expected value reading step of reading the number-of-lost-cells expected value of the table which corresponds to the index calculated in said index calculating step.

20. A method of controlling a call accept according to claim 14, wherein said according-to-interval number-of-lost-cells calculating step includes:

an inter two-points upper bound value calculating step of calculating a value obtained by subtracting an upper bound value of the cell arrival ratio distribution at the lower edge of each interval from the upper bound value of the cell arrival ratio distribution at the upper edge of each interval; and an according-to-interval number-of-lost-cells expected value calculating step of calculating a value obtained by multiplying the value calculated in said inter two-points upper bound value calculating step by the number-of-lost-cells expected value in the form of a number-of-lost-cells expected value as a contribution from the relevant interval.

21. A method of controlling a call accept comprising:

(a) a cell loss ratio calculation step of calculating a cell loss ratio of a buffer for storing call cell from a plurality of traffic source by a method comprising:

a second-order survivor function calculating step of calculating, for every traffic source, a second-order survivor function relative to a maximally dense packing pattern obtained based on traffic data inputted from the traffic source;

a minimum upper bound calculating step of calculating a minimum upper bound for every traffic source by performing an envelope arithmetic on a set of second-order survivor functions calculated in said second-order survivor function calculating step;

a number-of-lost-cells expected value calculating step of calculating a number-of-lost-cells expected value by convoluting the minimum upper bound for every traffic source that is calculated in said minimum bound calculating step;

a number-of-cell-arrivals expected value calculating step of calculating a number-of-cell-arrivals expected value for a predetermined observation time; and a cell loss ratio assured-side calculating step of calculating a cell loss ratio of said buffer on an assured side on the basis of the number-of-lost-cells expected value calculated in said number-of-lost-cells expected value calculating step and the number-of-cell-arrivals expected value calculated in said number-of-cell-arrivals expected value calculating step; and (b) a call accept determination step of comparing a cell loss ratio calculated by said cell loss ratio calculation step with a predetermined cell loss ratio fiducial value and determining whether or not a call accept request from each of the traffic sources is permitted on a result of this comparison.

22. A method of controlling a call accept according to claim 21, wherein said second-order survivor function calculating step includes:

a number-of-cell-arrivals calculating step of calculating a number of cell arrivals within the predetermined observation time on the basis of the maximally dense packing pattern;

a first-order survivor function acquiring step for acquiring a first-order survivor function by integrally calculating a number of cell arrivals that is calculated in said number-of-cell-arrivals calculating step; and a second-order survivor function acquiring step of acquiring a second-order survivor function by integrally calculating the first-order survivor function acquired in said first-order survivor function acquiring step.

23. A method of controlling a call accept according to claim 21, wherein the envelop arithmetic effected in said minimum upper bound calculating step is an arithmetic of selecting a maximum value among the values of the respective survivor functions.

24. A method of controlling a call accept according to claim 21, wherein each of the minimum upper bounds is convoluted based on a large deviation theory and evaluated on the assured side in said number-of-lost-cells expected value calculating step.

* * * * *